(12) United States Patent
Shahana et al.

(10) Patent No.: US 10,953,953 B2
(45) Date of Patent: Mar. 23, 2021

(54) BICYCLE CONTROLLER

(71) Applicant: Shimano Inc., Osaka (JP)

(72) Inventors: Satoshi Shahana, Osaka (JP); Yasuhiro Tsuchizawa, Osaka (JP); Hiroshi Matsuda, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/584,489

(22) Filed: Sep. 26, 2019

(65) Prior Publication Data

US 2020/0017166 A1    Jan. 16, 2020

Related U.S. Application Data

(62) Division of application No. 15/660,575, filed on Jul. 26, 2017, now Pat. No. 10,507,886.

(30) Foreign Application Priority Data

Jul. 29, 2016    (JP) .............................. JP2016-149752
Jun. 30, 2017    (JP) .............................. JP2017-129061

(51) Int. Cl.
*B62M 6/50*    (2010.01)
*B62M 6/45*    (2010.01)
*B62M 6/55*    (2010.01)
*B62M 6/90*    (2010.01)

(52) U.S. Cl.
CPC .............. *B62M 6/50* (2013.01); *B62M 6/45* (2013.01); *B62M 6/55* (2013.01); *B62M 6/90* (2013.01)

(58) Field of Classification Search
CPC . B62M 6/50; B62M 6/45; B62M 6/55; B62M 6/90
See application file for complete search history.

(56) References Cited

U.S. PATENT DOCUMENTS

| 8,634,979 B2 * | 1/2014 | Chien ...................... B62M 6/65 701/22 |
| 2006/0095191 A1 | 5/2006 | Lin |
| 2011/0048830 A1 | 3/2011 | Radtke et al. |
| 2015/0120240 A1 | 4/2015 | Fujita |

(Continued)

FOREIGN PATENT DOCUMENTS

| CN | 103661765 A | 3/2014 |
| CN | 104567805 A | 4/2015 |

(Continued)

OTHER PUBLICATIONS

Understanding DC motors, http://lancet.mit.edu/motors/motors3.html , (Year: 2020).*

*Primary Examiner* — Richard M Camby

(74) *Attorney, Agent, or Firm* — Global IP Counselors, LLP

(57) ABSTRACT

A bicycle controller controls a motor in accordance with the riding environment of a bicycle. The bicycle controller includes an electronic control unit that is configured to control a motor that assists in propulsion of a bicycle in accordance with operation of an operation unit provided on the bicycle. The electronic control unit is further configured to change an increasing speed of an output torque of the motor in accordance with at least one of an inclination angle of the bicycle and a change amount of the inclination angle of the bicycle.

12 Claims, 21 Drawing Sheets

(56) References Cited

U.S. PATENT DOCUMENTS

| | | |
|---|---|---|
| 2016/0009340 A1* | 1/2016 | Lin .......................... G01L 3/24 701/22 |
| 2016/0375955 A1 | 12/2016 | Negoro et al. |
| 2017/0043667 A1 | 2/2017 | Li |
| 2018/0257740 A1 | 9/2018 | Kikkawa |

FOREIGN PATENT DOCUMENTS

| | | | |
|---|---|---|---|
| CN | 105667693 A | 6/2016 | |
| DE | 21 2013 000 092 U1 | 12/2014 | |
| DE | 10 2015 118 150 A1 | 5/2016 | |
| JP | 2004-322809 A | 11/2004 | |
| JP | 3974974 B2 | 9/2007 | |
| JP | 3167746 U | 5/2011 | |
| JP | 5575968 B1 | 8/2014 | |

\* cited by examiner

BICYCLE CONTROLLER

CROSS-REFERENCE TO RELATED APPLICATIONS

This application is a divisional application of U.S. patent application Ser. No. 15/660,575, which was filed on filed on Jul. 26, 2017. This application claims priority to Japanese Patent Application No. 2016-149752, filed on Jul. 29, 2016, and Japanese Patent Application No. 2017-129061, filed on Jun. 30, 2017. The entire disclosures of Japanese Patent Application No. 2016-149752 and Japanese Patent Application No. 2017-129061 are hereby incorporated herein by reference. Also the entire disclosure of U.S. patent application Ser. No. 15/660,575 is hereby incorporated herein by reference.

BACKGROUND

Technical Field

The present invention generally relates to a bicycle controller.

Background Information

Japanese Patent No. 5575968 (Patent document 1) discloses a bicycle controller that changes the speed at which an output of a motor responds to a change in manual driving force. In a case in which the manual driving force decreases, the bicycle controller changes the response speed of the motor output in accordance with a crank rotation speed.

SUMMARY

There is a demand for a bicycle controller that is configured to control the motor in a suitable manner even if the riding environment of the bicycle changes. It is an object of the present invention to provide a bicycle controller that is configured to control a motor in accordance with the riding environment of a bicycle.

In accordance with a first aspect of the present disclosure, a bicycle controller includes an electronic control unit that is configured to control a motor that assists in propulsion of a bicycle in accordance with operation of an operation unit provided on the bicycle. The electronic control unit is further configured to change an increase rate of an output torque of the motor in accordance with at least one of an inclination angle of the bicycle and a change amount of the inclination angle of the bicycle.

With the bicycle controller according to the first aspect, in a case in which the motor is controlled in accordance with operation of the operation unit, the motor can be controlled so that the increase rate of the output torque of the motor is suitable for at least one of the inclination angle of the bicycle and the change amount of the inclination angle of the bicycle.

In accordance with a second aspect of the present disclosure, the bicycle controller according to the first aspect is configured so that the electronic control unit is further configured to increase the increase rate of the output torque of the motor in a case in which the inclination angle of the bicycle increases on an uphill.

With the bicycle controller according to the second aspect, the output torque of the motor is quickly increased in a case in which the inclination angle of the bicycle increases on an uphill.

In accordance with a third aspect of the present disclosure, the bicycle controller according to the first or second aspect is configured so that the electronic control unit is further configured to decrease the increase rate of the output torque of the motor in a case in which the inclination angle of the bicycle increases on a downhill.

With the bicycle controller according to the third aspect, increases in the output torque of the motor are limited in a case in which the inclination angle of the bicycle increases on a downhill.

In accordance with a fourth aspect of the present disclosure, the bicycle controller according to any one of the first to third aspects is configured so that the electronic control unit is further configured to increase the increase rate of the output torque of the motor in a case in which an increase rate of the inclination angle of the bicycle increases on an uphill.

With the bicycle controller according to the fourth aspect, the output torque of the motor can be quickly increased in a case in which the bicycle travels on an uphill road of which the gradient gradually increases.

In accordance with a fifth aspect of the present disclosure, the bicycle controller according to any one of the first to fourth aspects is configured so that the electronic control unit is further configured to decrease the increase rate of the output torque of the motor in a case in which an increase rate of the inclination angle of the bicycle increases on a downhill.

With the bicycle controller according to the fifth aspect, increases in the output torque of the motor are limited in a case in which the bicycle travels on a downhill road of which the gradient gradually increases.

In accordance with a sixth aspect of the present disclosure, the bicycle controller according to the first aspect further comprises an inclination detector that detects the inclination angle of the bicycle.

With the bicycle controller according to the sixth aspect, the inclination detector can detect the inclination angle of the bicycle.

In accordance with a seventh aspect of the present disclosure, the bicycle controller according to any one of the first to fifth aspects is configured so that the electronic control unit is further configured to compute the inclination angle based on the manual driving force and a rotation speed of a crank of the bicycle.

With the bicycle controller according to the seventh aspect, the electronic control unit computes the inclination angle based on the manual driving force and the rotation speed of the crank. Thus, in addition to a sensor that detects the manual driving force and the sensor that detects the crank rotation speed, there is no need for a separate sensor that detects the inclination angle.

In accordance with an eighth aspect of the present disclosure, the bicycle controller according to any one of the first to seventh aspects is configured so that the electronic control unit is further configured to switch between a riding mode and a walk mode in accordance with operation of the operation unit, and the electronic control unit is further drive the motor upon the walk mode being selected by the operation unit.

In accordance with a ninth aspect of the present disclosure, the bicycle controller according to the eighth aspect is configured so that the electronic control unit is further configured to increase the increase rate of the output torque of the motor in a case in which the inclination angle of the bicycle increases on an uphill while the walk mode.

In accordance with a tenth aspect of the present disclosure, the bicycle controller according to the eighth or ninth aspect is configured so that the electronic control unit is further configured to decrease the increase rate of the output torque of the motor in a case in which the inclination angle of the bicycle increases on a downhill while the walk mode.

In accordance with an eleventh aspect of the present disclosure, the bicycle controller according to any one of the eighth to tenth aspects is configured so that the electronic control unit is further configured to increase the increase rate of the output torque of the motor in a case in which an increase rate of the inclination angle of the bicycle increases on an uphill while the walk mode.

In accordance with a twelfth aspect of the present disclosure, the bicycle controller according to the first aspect is configured so that the electronic control unit is further configured to decrease the increase rate of the output torque of the motor in a case in which an increase rate of the inclination angle of the bicycle increases on a downhill while the walk mode.

Accordingly, the bicycle controller according to the present disclosure is configured to control a motor in accordance with the riding environment of a bicycle. Also, other objects, features, aspects and advantages of the disclosed bicycle controller will become apparent to those skilled in the art from the following detailed description, which, taken in conjunction with the annexed drawings, discloses preferred embodiments of the bicycle controller.

BRIEF DESCRIPTION OF THE DRAWINGS

Referring now to the attached drawings which form a part of this original disclosure.

DETAILED DESCRIPTION OF EMBODIMENTS

Figure 1:
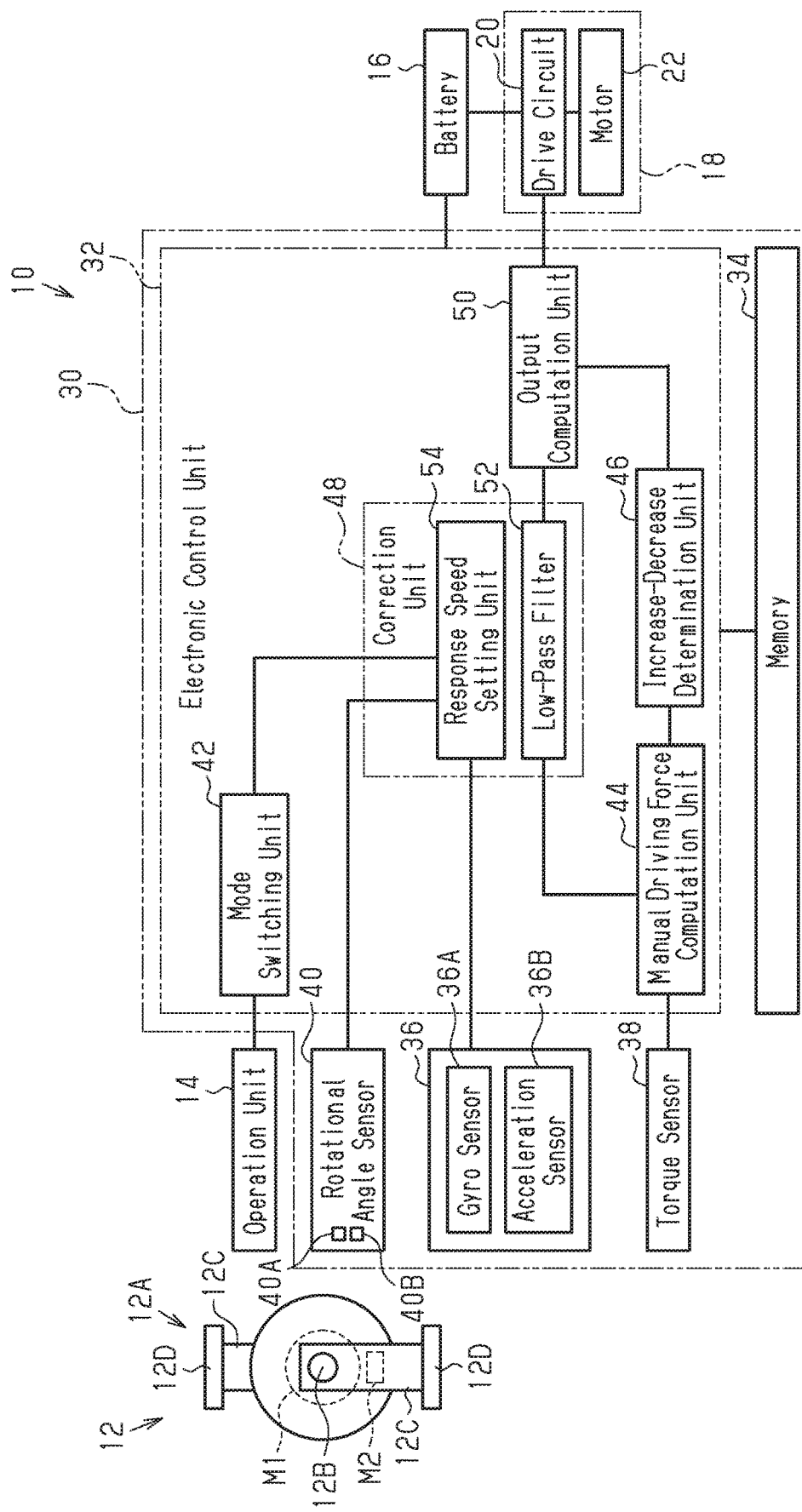
FIG. 1 is a block diagram in accordance with an electrical configuration of a bicycle including a bicycle controller in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

A bicycle 10 including one embodiment of a bicycle controller will now be described with reference to FIG. 1. The bicycle 10 includes a drive mechanism 12, an operation unit 14, a battery 16, an assist device 18 and a bicycle controller 30. The bicycle 10 is, for example, a mountain bike but can be a road bike or a city bike.

The drive mechanism 12 includes a crank 12A and a pair of pedals 12D. The crank 12A includes a crankshaft 12B and a pair of crank arms 12C. The drive mechanism 12 transmits a manual driving force, which is applied to the pedals 12D by a rider to rotate a rear wheel (not shown). The drive mechanism 12 is configured to transmit the rotation of the crank through, for example, a chain, a belt or a shaft (none shown). The drive mechanism 12 includes a front rotating body (not shown) that is connected to the crankshaft 12B by a one-way clutch (not shown). The one-way clutch is configured to rotate the front rotating body forward in a case in which the crank 12A is rotated forward. The one-way clutch is configured to restrict rearward rotation of the front rotating body in a case in which the crank 12A is rotated rearward. The front rotating body includes a sprocket, a pulley, or a bevel gear (none shown). The front rotating body can be connected to the crankshaft 12B without the one-way clutch.

The operation unit 14 is provided on the bicycle 10. The operation unit 14 is configured to communicate with an electronic control unit 32 of the bicycle controller 30 through a wired connection or a wireless connection. The operation unit 14 includes, for example, an operation member, a sensor that detects movement of the operation member, and an electronic circuit that performs communication with the electronic control unit 32 in accordance with the output signal of the sensor. The operation unit 14 includes one or more operation members that change riding modes of the motor 22. The operation members include a push switch, a lever type switch and a touch panel. If a rider operates the operation unit 14, then the operation unit 14 transmits a switch signal that switches riding modes of the bicycle 10 to the electronic control unit 32. The riding modes include a first mode and a second mode. The first mode is suitable for rough roads that are bumpy. The second mode is suitable for even roads.

The battery 16 includes one or more battery cells. The battery cells include rechargeable batteries. The battery 16 is electrically connected to a motor 22 of the assist device 18 to supply the motor 22 with power. The battery 16 supplies power to the bicycle controller 30 and other electronic components that are mounted on the bicycle 10 and electrically connected to the battery 16 by wires.

The assist device 18 includes a drive circuit 20 and the motor 22. The drive circuit 20 controls the power supplied from the battery 16 to the motor 22. The motor 22 assists propulsion of the bicycle 10. The motor 22 includes an electric motor. The motor 22 is configured to transmit rotation to a manual driving force transmission path, which extends from the pedals 12D to a rear wheel (not shown) or a front wheel (not shown). The motor 22 is arranged on a frame (not shown), the rear wheel, or the front wheel of the bicycle 10. In one example, the motor 22 is connected to a power transmission path that extends from the crankshaft 12B to a front rotating body. It is preferred that the power transmission path from the motor 22 to the crankshaft 12B include a one-way clutch (not shown) that is configured so that the crank rotation force produced by the rotation of the crankshaft 12B to move the bicycle forward does not affect the rotation produced by the motor 22. The assist device 18 can include a reduction gear that reduces the speed of the rotation produced by the motor 22 before outputting the rotation.

The bicycle controller 30 includes the electronic control unit 32. In one example, the bicycle controller 30 further includes a memory 34, an inclination detector 36, a torque sensor 38, and a rotational angle sensor 40.

The electronic control unit 32 includes one or more processors that executes predetermined control programs. The processor(s) includes, for example, a central processing unit (CPU) or a micro-processing unit (MPU). The memory 34 stores information used for various control programs and various control processes. The memory 34 includes, for example, a non-volatile memory and a volatile memory. The memory 34 is one or more storage devices (i.e., one or more computer memory devices). The memory 34 can be, for example, any a non-transitory computer readable medium such as a ROM (Read Only Memory) device, a RAM (Random Access Memory) device, a hard disk, a flash drive, etc. The memory 34 is configured to store settings, programs, data, calculations and/or results of the processor(s) of the electronic control unit 32.

The inclination detector 36 detects an inclination angle D of the bicycle 10. The inclination detector 36 is configured to communicate with the electronic control unit 32 through a wired connection or a wireless connection. The inclination detector 36 includes a three-axis gyro sensor 36A and a three-axis acceleration sensor 36B. The output of the inclination detector 36 includes information related to the attitude angle on each of the three axes and the acceleration on each of the three axes. The three attitude angles include a pitch angle DA, a roll angle DB and a yaw angle DC. Preferably, the three axes of the gyro sensor 36A coincide with the three axes of the acceleration sensor 36B. The inclination detector 36 corrects the output of the gyro sensor 36A in accordance with the output of the acceleration sensor 36B and sends a signal to the electronic control unit 32 corresponding to the inclination angle D of the bicycle 10. The inclination angle D of the bicycle 10 is the absolute value of the pitch angle DA. In a case in which the bicycle 10 is traveling on an uphill, the pitch angle DA is positive. In a case in which the bicycle 10 is traveling on an uphill, an increase in the inclination angle D corresponds to an increase in the pitch angle DA. In a case in which the bicycle 10 is traveling on a downhill, the pitch angle DA is negative. In a case in which the bicycle 10 is on a downhill, an increase in the inclination angle D corresponds to a decrease in the pitch angle DA. The assist device 18 can include a one-axis acceleration sensor or a two-axis acceleration sensor instead of the gyro sensor 36A and the acceleration sensor 36B.

The torque sensor 38 outputs a signal that is in accordance with a manual driving force T. The torque sensor 38 detects the manual driving force T applied to the crankshaft 12B. The torque sensor 38 can be arranged between the crankshaft 12B and the front rotating body (not shown). Alternatively, the torque sensor 38 can be arranged on the crankshaft 12B or the front sprocket. As another option, the torque sensor 38 can be arranged on the crank arms 12C or the pedals 12D. The torque sensor 38 can be realized by, for example, a strain sensor, a magnetostrictive sensor, an optical sensor, a pressure sensor, or the like. Any sensor can be used as the torque sensor 38 as long as the sensor outputs a signal corresponding to the manual driving force T applied to the crank arms 12C or the pedals 12D.

The rotational angle sensor 40 detects a crank rotation speed N and a rotational angle of the crank 12A. The rotational angle sensor 40 is attached to the frame (not shown) of the bicycle 10 or a housing (not shown) of the assist device 18. The rotational angle sensor 40 includes a first element 40A and a second element 40B. The first element 40A detects the magnetic field of a first magnet M1. The second element 40B outputs a signal corresponding to the positional relationship with a second magnet M2. The first magnet M1 is arranged on the crankshaft 12B or the crank arms 12C and coaxial with the crankshaft 12B. The first magnet M1 is an annular magnet, in which multiple magnetic poles are alternately arranged in the circumferential direction. The first element 40A detects the rotational angle of the crank 12A relative to the frame. The first element 40A outputs a signal as the crank 12A completes a single rotation. A single cycle of the signal corresponds to the angle obtained by dividing 360 degrees by the number of magnetic poles having the same polarity. The minimum value of the rotational angle of the crank 12A that is detectable by the rotational angle sensor 40 is 180 degrees or smaller, preferably, 15 degrees, and further preferably, 6 degrees. The second magnet M2 is arranged on the crankshaft 12B or the crank arms 12C. The second element 40B detects a reference angle of the crank 12A relative to the frame (e.g., top dead center or bottom dead center of crank 12A). The second element 40B outputs a signal of which a single cycle is one rotation of the crankshaft 12B.

Instead of the first element 40A and the second element 40B, the rotational angle sensor 40 can include a magnetic sensor that outputs a signal in accordance with the intensity of the magnetic field. In this case, instead of the first magnet M1 and the second magnet M2, an annular magnet of which the magnetic field intensity varies in the circumferential direction is arranged on the crankshaft 12B coaxially with the crankshaft 12B. The use of the magnetic sensor that outputs a signal corresponding to the magnetic field intensity allows the crank rotation speed N and the rotational angle of the crank 12A to be detected with a single sensor. This simplifies the structure and facilitates the assembling.

The electronic control unit 32 is configured (programmed) control the motor 22 in accordance with the manual driving force T. The electronic control unit 32 uses a low-pass filter 52 to change the response speed of the motor 22 with respect to changes in the manual driving force T. The electronic control unit 32 is configured to change the response speed of the motor 22 if the manual driving force T decreases. The response speed of the motor 22 in a case in which the manual driving force T decreases is referred to as the response speed R.

The electronic control unit 32 is configured to change the response speed R in accordance with the inclination angle D of the bicycle 10. The electronic control unit 32 is configured to change the response speed R in a stepped manner in accordance with the inclination angle D of the bicycle 10. Further, the electronic control unit 32 is configured to change the response speed R in accordance with the crank rotation speed N. The electronic control unit 32 is configured to switch between the first mode and the second mode in accordance with the operation of the operation unit 14. The first mode and the second mode differ from each other in the response speed R with respect to the inclination angle D and the crank rotation speed N.

As the inclination angle D of the bicycle 10 increases on an uphill, the electronic control unit 32 is configured to decrease the response speed R of the motor 22. As the inclination angle D of the bicycle 10 on an uphill becomes greater than or equal to a first angle D1, the electronic control unit 32 is configured to fix the response speed R. More specifically, in the first mode, the electronic control unit 32 is configured to decrease the response speed of the motor 22 as the inclination angle D of the bicycle 10 increases on an uphill. Further, in the first mode, the electronic control unit 32 is configured to fix the response speed R as the inclination angle D of the bicycle 10 on an uphill becomes greater than or equal to the first angle D1. In the second mode, the electronic control unit 32 is also configured to decrease the response speed of the motor 22 as the inclination angle D of the bicycle 10 increases on an uphill.

As the inclination angle D of the bicycle 10 increases on a downhill, the electronic control unit 32 is configured to increase the response speed R. As the inclination angle D of the bicycle 10 on a downhill becomes greater than or equal to a second angle D2, the electronic control unit 32 is configured to fix the response speed R. More specifically, in the second mode, the electronic control unit 32 is configured to increase the response speed R as the inclination angle D of the bicycle 10 increases on a downhill. Further, in the second mode, the electronic control unit 32 is configured to fix the response speed R as the inclination angle D of the bicycle 10 on a downhill becomes greater than or equal to the second angle D2. In the first mode, the electronic control unit 32 can also increase the response speed R as the inclination angle D of the bicycle 10 increases on a downhill and fix the response speed R as the inclination angle D of the bicycle 10 on a downhill becomes greater than or equal to the second angle D2.

The electronic control unit 32 is configured to control the motor 22 in the first mode that decreases the response speed R as the crank rotation speed N increases. Further, in the first mode, the electronic control unit 32 fixes the response speed R as the crank rotation speed N becomes higher than or equal to a first speed N1. The electronic control unit 32 is also configured to control the motor 22 in the second mode that increases the response speed R as the crank rotation speed N increases. Further, in the second mode, the electronic control unit 32 is configured to fix the response speed R as the crank rotation speed N becomes higher than or equal to a second speed N2.

The electronic control unit 32 includes a mode switching unit 42, a manual driving force computation unit 44, an increase-decrease determination unit 46, a correction unit 48 and an output computation unit 50. The processor of the electronic control unit 32 executes programs to function as the mode switching unit 42, the manual driving force computation unit 44, the increase-decrease determination unit 46, the correction unit 48 and the output computation unit 50.

The mode switching unit 42 switches the riding mode of the bicycle 10 based on a switch signal from the operation unit 14. In a case in which the mode switching unit 42 receives a switch signal from the operation unit 14 for switching the riding mode to the first mode, the mode switching unit 42 transmits a signal to the correction unit 48 for setting a first map that corresponds to the first mode and is stored in the memory 34. In a case in which the mode switching unit 42 receives a switch signal from the operation unit 14 for switching the riding mode to the second mode, the mode switching unit 42 transmits a signal to the correction unit 48 for setting a second map that corresponds to the second mode and is stored in the memory 34.

The manual driving force computation unit 44 is configured to compute the manual driving force T based on the output from the torque sensor 38. The increase-decrease determination unit 46 determines whether the manual driving force T is increasing or decreasing. For example, the increase-decrease determination unit 46 determines whether the manual driving force T in the present computation cycle has increased or decreased from the manual driving force T of the previous computation cycle.

The correction unit 48 includes the low-pass filter 52 and a response speed setting unit 54. The correction unit 48 is configured to correct the manual driving force T. The low-pass filter 52 is a linear low-pass filter. The low-pass filter 52 uses a time constant K to correct the manual driving force T to a corrected driving force TX. An increase in the time constant K decreases the response speed R and retards changing of the corrected driving force TX with respect to the manual driving force T.

The response speed setting unit 54 sets the time constant K used by the low-pass filter 52. The response speed setting unit 54 sets the time constant K based on the first or second map, which is set by the mode switching unit 42, the inclination angle D, and the crank rotation speed N.

The output computation unit 50 is configured to compute the output of the motor 22 (hereinafter referred to as "the motor output TM") based on the manual driving force T. The output computation unit 50 computes the motor output TM as, for example, at least one of the motor torque and the motor rotation speed. The output computation unit 50 selects one of the manual driving force T and the corrected driving force TX based on the determination result of the increase-decrease determination unit 46 and the comparison result of the manual driving force T and the corrected driving force TX. Then, the output computation unit 50 computes the motor output TM based on the selected one of the manual driving force T and the corrected driving force TX. More specifically, in a case in which the manual driving force T decreases, the output computation unit 50 computes the motor output TM by multiplying the corrected driving force TX by a predetermined value. In a case in which the manual driving force T increases and the manual driving force T is less than the corrected driving force TX, the output computation unit 50 computes the motor output TM by multiplying the corrected driving force TX by a predetermined value. In a case in which the manual driving force T increases and the manual driving force T is greater than or equal the corrected driving force TX, the output computation unit 50 computes the motor output TM by multiplying the manual driving force T by a predetermined value. The predetermined value is changed in accordance with the riding mode. The ratio of the motor output TM to the manual driving force T differs between riding mode. The rider switches the riding mode by operating the operation unit 14. The electronic control unit 32 sends a control signal to the drive circuit 20 based on the computed motor output TM.

The motor control executed by the electronic control unit 32 will now be described with reference to FIG. 2. While the electronic control unit 32 is being supplied with power, the motor control is executed in predetermined cycles. In step S11, the electronic control unit 32 computes the manual driving force T. In step S12, the electronic control unit 32 determines whether or not the present riding mode is the first mode. If the electronic control unit 32 determines that the riding mode is the first mode, then the electronic control unit 32 proceeds to step S13. In step S13, the electronic control unit 32 computes the corrected driving force TX based on the first map, the inclination angle D, the crank rotation speed N and the manual driving force T. Then, the electronic control unit 32 proceeds to step S14.

In step S14, the electronic control unit 32 determines whether or not the manual driving force T is decreasing. For example, if the manual driving force T in the present computation cycle is less than the manual driving force T in the preceding computation cycle, then the electronic control unit 32 determines that the manual driving force T is decreasing.

If the electronic control unit 32 determines in step S14 that the manual driving force T is decreasing, then the electronic control unit 32 proceeds to step S15 and computes the motor output TM based on the corrected driving force TX, which was computed in step S13. Then, the electronic control unit 32 proceeds to step S16. In step S16, the electronic control unit 32 controls the motor 22 based on the motor output TM. Then, after a predetermined cycle, the electronic control unit 32 starts the process again from step S11.

In a case in which the first mode is selected and the crank rotation speed N does not change, the response speed R is decreased as the inclination angle D increases on an uphill. In a case in which the first mode is selected and the inclination angle D on an uphill is greater than or equal to the first angle D1, the response speed R is set to a first value R1. In a case in which the first mode is selected and the inclination angle D does not change, the response speed R is decreased if the crank rotation speed N is increased. In a case in which the first mode is selected and the crank rotation speed N is higher than or equal to the first speed N1, the response speed R is fixed.

Figure 3:
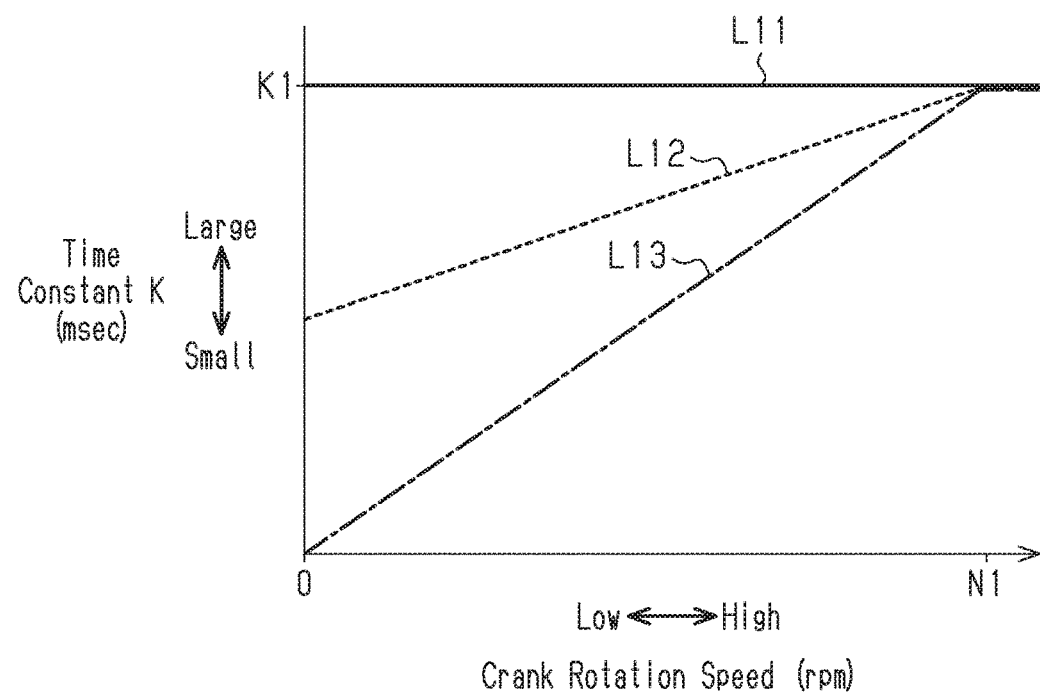
FIG. 3 is a graph in accordance with the relationship of a time constant and a crank rotation speed with respect to an inclination angle in a first mode set by the electronic control unit shown in FIG. 1.

Referring to FIG. 3, in the first map, the time constant K for a given crank rotation speed N increases as the pitch angle DA increases. Thus, in the first map, as the inclination angle D increases on an uphill, the time constant K for a given crank rotation speed N increases, and the response speed R decreases.

In FIG. 3, a first line L11 indicates the relationship of the crank rotation speed N and the time constant K in a case in which the pitch angle DA is a first pitch angle DA1. The first line L11 is the solid line. A second line L12 indicates the relationship of the crank rotation speed N and the time constant K in a case in which the pitch angle DA is a second pitch angle DA2. The second line L12 is the dotted line. A third line L13 indicates the relationship of the crank rotation speed N and the time constant K in a case in which the pitch angle DA is a third pitch angle DA3. The third line L13 is the single-dashed line. The first pitch angle DA1, the second pitch angle DA2, and the third pitch angle DA3 have a relationship of DA1>DA2>DA3. The first pitch angle DA1, which is a positive value, is the pitch angle DA of the bicycle 10 that corresponds to a road gradient of 10%. In a case in which the pitch angle DA is the first pitch angle DA1, the inclination angle D of the bicycle 10 on an uphill is the first angle D1. In one example, the first pitch angle DA1 is +5.7 degrees, the second pitch angle DA2 is +2.8 degrees, and the third pitch angle DA3 is 0 degrees.

In the first map, the time constant K is constant if the pitch angle DA is greater than or equal to the first pitch angle DA1. As shown by the first line L11, if the pitch angle DA is the first pitch angle DA1, then a first predetermined value K1 is selected as the time constant K regardless of the crank rotation speed N.

In the first map, the time constant K increases as the crank rotation speed N increases if the pitch angle DA is less than the first pitch angle DA1. Further, in the first map, the time constant K is constant if the crank rotation speed N becomes higher than or equal to the first speed N1 if the pitch angle DA is less than the first pitch angle DA'. In one example, in a case in which the crank rotation speed N becomes higher than or equal to the first speed N1 if the pitch angle DA is less than the first pitch angle DA1, the time constant K is equal to the time constant K1, which is for a case in which the pitch angle DA is greater than or equal to the first pitch angle DA1.

As shown by the second line L12, if the pitch angle DA is the second pitch angle DA2, then the time constant K increases in a linear manner as the crank rotation speed N increases, and the time constant K is set to the first predetermined value K1 as the crank rotation speed N becomes higher than or equal to the first speed N1. As shown by the third line L13, if the pitch angle DA is the third pitch angle DA3, then the time constant K increases in a linear manner as the crank rotation speed N increases, and the time constant is set to the first predetermined value K1 as the crank rotation speed N becomes higher than or equal to the first speed N1. If the pitch angle DA is the third pitch angle DA3 and the crank rotation speed N is lower than the first speed N1, under a condition in which the crank rotation speed N is the same, then the time constant K is less than that for a case in which the pitch angle DA is the second pitch angle DA2.

In the first map, the relationship of the crank rotation speed N and the time constant K in a case in which the crank rotation speed N is lower than or equal to the first speed N1 is set in advance with a first computation equation. The first computation equation includes a coefficient that is determined in accordance with the inclination angle D. The first computation equation is, for example, as shown below by equation (1).

$$K=(4 \times A1 \times N)+(L1 \times A2) \quad (1)$$

In equation (1), "L1" represents a constant, "N" represents the crank rotation speed N, "A1" represents a coefficient determined in accordance with the inclination angle D, and "A2" represents a coefficient determined in accordance with the inclination angle D. Further, "A1" is set to decrease as the inclination angle D increases, and "A2" is set to increase as the inclination angle D increases. Table 1 shows one example of the relationship of "A1" and "A2" with respect to the inclination angle D.

TABLE 1

|  | Pitch Angle | Road | Inclination Angle | Gradient | A1 | A2 |
|---|---|---|---|---|---|---|
| 1st Pitch Angle DA1 | +5.7° | Uphill | 5.7° | +10% | 0 | 2 |
| 2nd Pitch angle DA2 | +2.8° | Uphill | 2.8° | +5% | 0.5 | 1.0 |
| 3rd Pitch Angle DA3 | 0° |  | 0° | 0% | 1.0 | 0 |

Figure 2:
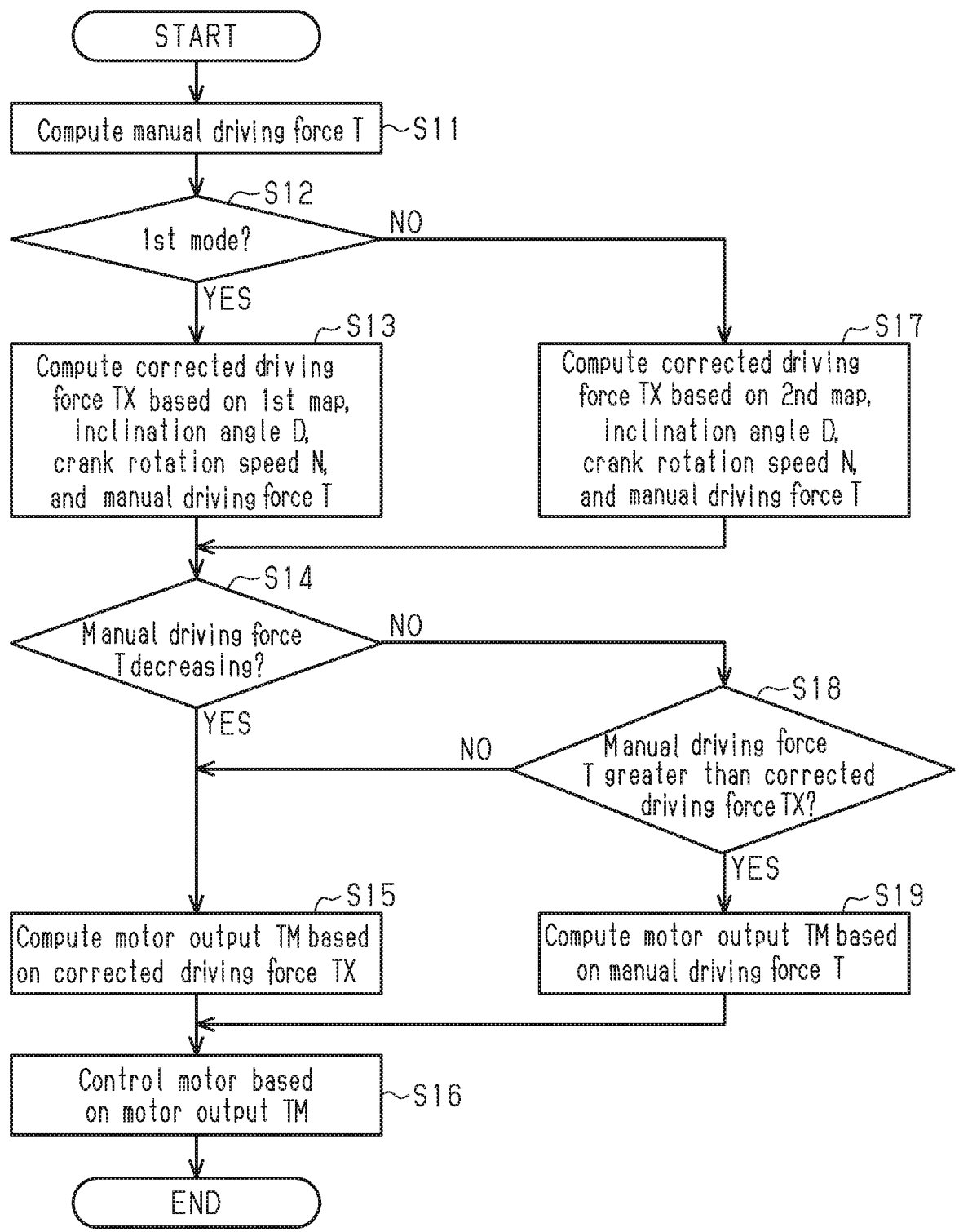
FIG. 2 is a flowchart of a motor control executed by an electronic control unit shown in FIG. 1.

As shown in FIG. 2, if the electronic control unit 32 determines in step S12 that the present riding mode is not the first mode, that is, the present mode is the second mode, then the electronic control unit 32 proceeds to step S17. In step S17, the electronic control unit 32 computes the corrected driving force TX based on the second map, the inclination angle D, the crank rotation speed N and the manual driving force T. Then, the electronic control unit 32 proceeds to step S14.

In step S14, the electronic control unit 32 determines whether or not the manual driving force T is decreasing. If the electronic control unit 32 determines in step S14 that the manual driving force T is decreasing, in step S15, then the electronic control unit 32 computes the motor output TM based on the corrected driving force TX, which has been computed in step S17, and proceeds to step S16. In step S16, the electronic control unit 32 controls the motor 22 based on the motor output TM. Then, after a predetermined cycle, the electronic control unit 32 starts the process again from step S11.

In a case in which the second mode is selected and the crank rotation speed N does not change, the response speed R increases as the inclination angle D increases on a downhill. In a case in which the second mode is selected and the inclination angle D is less than or equal to the second angle D2 on a downhill, the response speed R is a second value R2. The response speed R is the highest if it is the second value R2. In one example, the second value R2 is equal to the response speed R if the manual driving force T is increasing. In a case in which the second mode is selected and the inclination angle D does not change, the response speed R is increased as the crank rotation speed N increases. In a case in which the second mode is selected and the crank rotation speed N becomes higher than or equal to the second speed N2, the response speed R is fixed.

Figure 4:
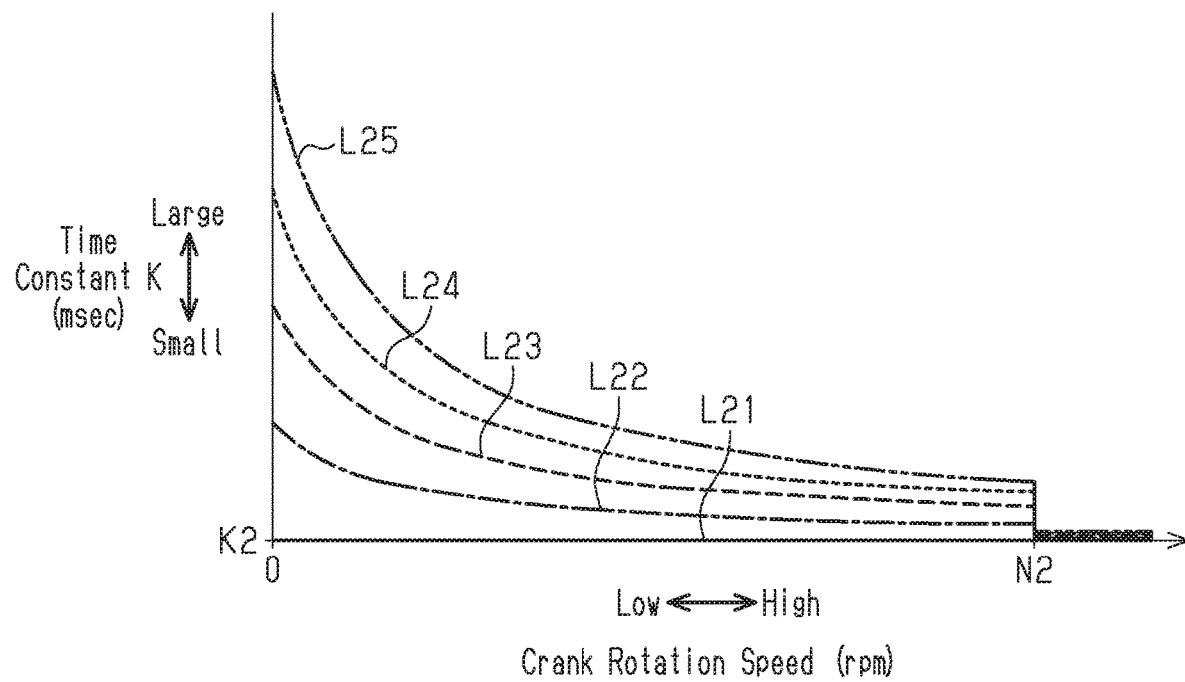
FIG. 4 is a graph in accordance with the relationship of the time constant and the crank rotation speed with respect to the inclination angle in a second mode set by the electronic control unit shown in FIG. 1.

As shown in FIG. 4, in the second map, the time constant K for a given crank rotation speed N increases as the pitch angle DA increases. Thus, in the second map, as the inclination angle D increases on a downhill, the time constant K for a given crank rotation speed N decreases. This decreases the response speed R.

In FIG. 4, a first line L21 indicates the relationship of the crank rotation speed N and the time constant K in a case in which the pitch angle DA is a fourth pitch angle DA4. The first line L21 is the solid line. A second line L22 indicates the relationship of the crank rotation speed N and the time constant K in a case in which the pitch angle DA is a fifth pitch angle DA5. The second line L22 is the single-dashed line. A third line L23 indicates the relationship of the crank rotation speed N and the time constant K in a case in which the pitch angle DA is a sixth pitch angle DA6. The third line L23 is the dashed line. A fourth line L24 indicates the relationship of the crank rotation speed N and the time constant K in a case in which the pitch angle DA is a seventh pitch angle DA7. The fourth line L24 is the dotted line. A fifth line L25 indicates the relationship of the crank rotation speed N and the time constant K in a case in which the pitch angle DA is an eighth pitch angle DA8. The fifth line L25 is the double-dashed line. The fourth pitch angle DA4, the fifth pitch angle DA5, the sixth pitch angle DA6, the seventh pitch angle DA7, and the eighth pitch angle DA8 have a relationship of DA4<DA5<DA6<DA7<DA8. The fourth pitch angle DA4, which is a negative value, is the pitch angle DA of the bicycle 10 corresponding to a road gradient of, for example, minus 10%. If the pitch angle DA is the fourth pitch angle DA4, then the inclination angle D of the bicycle 10 on a downhill is the second angle D2. In one example, the fourth pitch angle DA4 is −5.7 degrees, the fifth pitch angle DA5 is −2.8 degrees, the sixth pitch angle DA6 is zero degrees, the seventh pitch angle DA7 is +2.8 degrees, and the eighth pitch angle DA8 is +5.7 degrees.

In the second map, the time constant K is constant if the pitch angle DA is less than or equal to the fourth pitch angle DA4. As shown by the first line L21, in a case in which the pitch angle DA is the fourth pitch angle DA4, a second predetermined value K2 is selected as the time constant K regardless of the crank rotation speed N. The second predetermined value K2 is, for example, 0.

In the second map, the time constant K decreases as the crank rotation speed N increases if the pitch angle DA is greater than the fourth pitch angle DA4. Further, in the second map, the time constant K is constant if the crank rotation speed N becomes higher than or equal to the second speed N2 if the pitch angle DA is greater than the fourth pitch angle DA4. In one example, in a case in which the crank rotation speed N becomes higher than or equal to the second speed N2 if the pitch angle DA is greater than the fourth pitch angle DA4, the time constant K is equal to the time constant K2 for a case in which the pitch angle DA is less than or equal to the fourth pitch angle DA4.

As shown by the second line L22, if the pitch angle DA is the fifth pitch angle DA5, then the time constant K decreases in an exponential manner as the crank rotation speed N increases, and the time constant K is set to the second predetermined value K2 if the crank rotation speed N becomes higher than or equal to the second speed N2.

As shown by the third line L23, if the pitch angle DA is the sixth pitch angle DA6, then the time constant K decreases in an exponential manner as the crank rotation speed N increases, and the time constant K is set to the second predetermined value K2 if the crank rotation speed N becomes higher than or equal to the second speed N2. If the pitch angle DA is the sixth pitch angle DA6 and the crank rotation speed N is lower than the second speed N2, under a condition in which the crank rotation speed N is the same, then the time constant K is greater than that for a case in which the pitch angle DA is the fifth pitch angle DA5.

As shown by the fourth line L24, if the pitch angle DA is the seventh pitch angle DA7, then the time constant K decreases in an exponential manner as the crank rotation speed N increases, and the time constant K is set to the second predetermined value K2 if the crank rotation speed N becomes higher than or equal to the second speed N2. If the pitch angle DA is the seventh pitch angle DA7 and the crank rotation speed N is lower than the second speed N2, under a condition in which the crank rotation speed N is the same, then the time constant K is greater than that for a case in which the pitch angle DA is the sixth pitch angle DA6.

As shown by the fifth line L25, if the pitch angle DA is the eighth pitch angle DA8, then the time constant K decreases in an exponential manner as the crank rotation speed N increases, and the time constant K is set to the second predetermined value K2 if the crank rotation speed N becomes higher than or equal to the second speed N2. If the pitch angle DA is the eighth pitch angle DA8 and the crank rotation speed N is lower than the second speed N2, under a condition in which the crank rotation speed N is the same, then the time constant K is greater than that for a case in which the pitch angle DA is the seventh pitch angle DA7.

In the second map, the relationship of the crank rotation speed N and the time constant K if the crank rotation speed N is lower than or equal to the second speed N2 is set in advance with a second computation equation. The second computation equation includes a coefficient that is determined in accordance with the pitch angle DA. The second computation equation is, for example, as shown below by equation (2).

$$K=(L2 \times B) \div 100 \div N \times 1000 \qquad (2)$$

In equation (2), "L2" represents a constant, "N" represents the crank rotation speed N, and "B" represents a coefficient determined in accordance with the pitch angle DA. Further, "B" is set to increase as the pitch angle DA increases. Table 2 shows one example of the relationship of "B" and the pitch angle DA.

TABLE 2

| | Pitch Angle | Road | Inclination Angle | Gradient | B |
|---|---|---|---|---|---|
| 4th Pitch Angle DA4 | −5.7° | Downhill | 5.7° | −10% | 0 |
| 5th Pitch Angle DA5 | −2.8° | Downhill | 2.8° | −5% | 0.5 |
| 6th Pitch Angle DA6 | 0° | | 0° | 0% | 1.0 |
| 7th Pitch Angle DA7 | +2.8° | Uphill | 2.8° | +5% | 1.5 |
| 8th Pitch Angle DA8 | +5.7° | Uphill | 5.7° | +10% | 2.0 |

As shown in FIG. 2, if the electronic control unit 32 determines in step S14 that the manual driving force T is not decreasing, then the electronic control unit 32 proceeds to step S18 and determines whether or not the manual driving force T is greater than the corrected driving force TX. If the electronic control unit 32 determines in step S18 that the manual driving force T is greater than the corrected driving force TX, then the electronic control unit 32 proceeds to step S19 and computes the motor output TM based on the manual driving force T. Then, the electronic control unit 32 proceeds to step S16. In step S16, the electronic control unit 32 controls the motor 22 based on the motor output TM. Then, after a predetermined cycle, the electronic control unit 32 starts the process again from step S11.

If the electronic control unit 32 determines in step S18 that the manual driving force T is less than or equal to the corrected driving force TX, then the electronic control unit 32 proceeds to step S15 and computes the motor output TM based on the corrected driving force TX. Then, the electronic control unit 32 proceeds to step S16. In step S16, the electronic control unit 32 controls the motor 22 based on the motor output TM. Then, after a predetermined cycle, the electronic control unit 32 starts the process again from step S11. In this manner, during the period in which the manual driving force T is increasing, the electronic control unit 32 controls the motor 22 based on the greater one of the manual driving force T and the corrected driving force TX.

Figure 5:
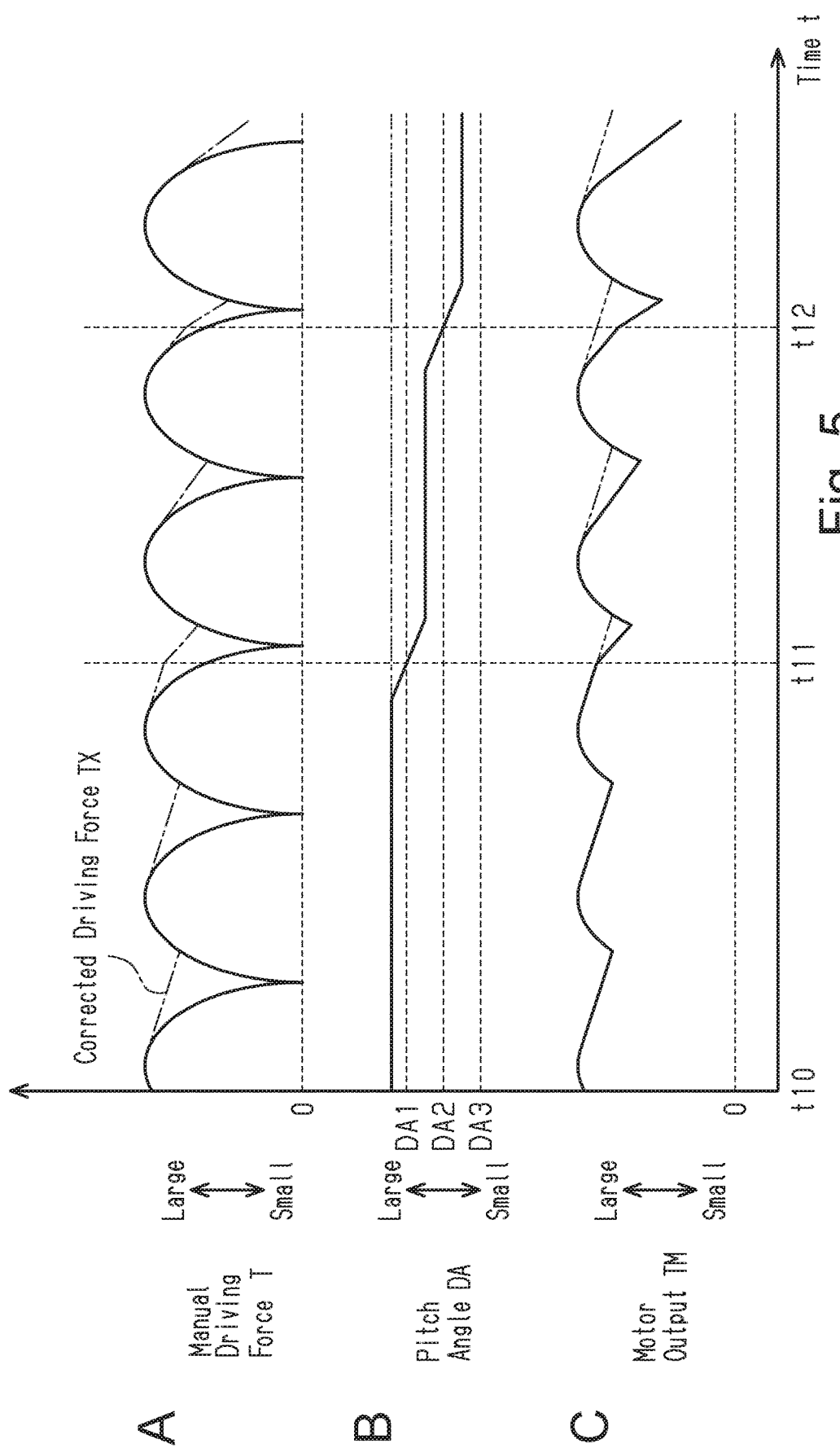
FIG. 5 is a series of timing charts in accordance with one example of the motor control in the first mode.

With reference to FIG. 5, one example of the motor control that is executed in a case in which the first mode is selected will now be described. Timing chart A of FIG. 5 shows the relationship of time and the manual driving force T. Timing chart B of FIG. 5 shows the relationship of time and the pitch angle DA. Timing chart C of FIG. 5 shows the relationship of time and the motor output TM. Further, the timing charts A to C of FIG. 5 show a state in which the crank rotation speed N is constant as the bicycle 10 travels. In the timing chart C of FIG. 5, the solid line represents the motor output TM in a case in which the inclination angle D changes as the bicycle 10 travels, and the double-dashed line represents the motor output TM in a case in which the inclination angle D does not change as the bicycle 10 travels.

In the timing charts A to C of FIG. 5, in the period from time t10 to time t11, the pitch angle DA is greater than or equal to the first pitch angle DA1. During this period, in a case in which the manual driving force T is greater than the corrected driving force TX, if the manual driving force T is increased, that is, if the crank arms 12C (refer to FIG. 1) are rotated from the top dead center or the bottom dead center toward an intermediate angle between the top dead center and the bottom dead center, then the motor output TM is changed at an increase rate that is substantially equal to the increase rate of the manual driving force T. If the manual driving force T is decreased, that is, if the crank arms 12C (refer to FIG. 1) are rotated from an intermediate angle between the top dead center and the bottom dead center toward the top dead center or the bottom dead center, then the motor output TM is decreased at a decrease rate that is more gradual than the decrease rate of the manual driving force T.

At time t11, the pitch angle DA becomes less than or equal to the first pitch angle DA1 but is greater than the second pitch angle DA2. Here, the electronic control unit 32 decreases the time constant K in accordance with the pitch angle DA. Thus, the decrease rate of the corrected driving force TX becomes greater than the decrease rate of the period from time t10 to t11, and the decrease rate of the corrected driving force TX approaches the decrease rate of the manual driving force T. Further, the decrease rate of the motor output TM approaches the decrease rate of the manual driving force T. That is, the response speed R of the motor 22 is increased with respect to a change in the manual driving force T. In a case in which the pitch angle DA remains less than or equal to the first pitch angle DA1 but greater than the second pitch angle DA2, if the manual driving force T decreases, then the electronic control unit 32 controls the motor 22 with a fixed response speed R.

At time t12, the pitch angle DA becomes less than or equal to the second pitch angle DA2 but is greater than the third pitch angle DA3. Thus, the decrease rate of the corrected driving force TX becomes greater than the decrease rate of the period from time t11 to time t12. Further, the decrease rate of the motor output TM further approaches the decrease rate of the manual driving force T. That is, the response speed R of the motor 22 is increased with respect to the manual driving force T. In a case in which the pitch angle DA remains greater than or equal to the third pitch angle DA3, if the manual driving force T is decreased, then the electronic control unit 32 controls the motor 22 with a fixed response speed R.

Figure 6:
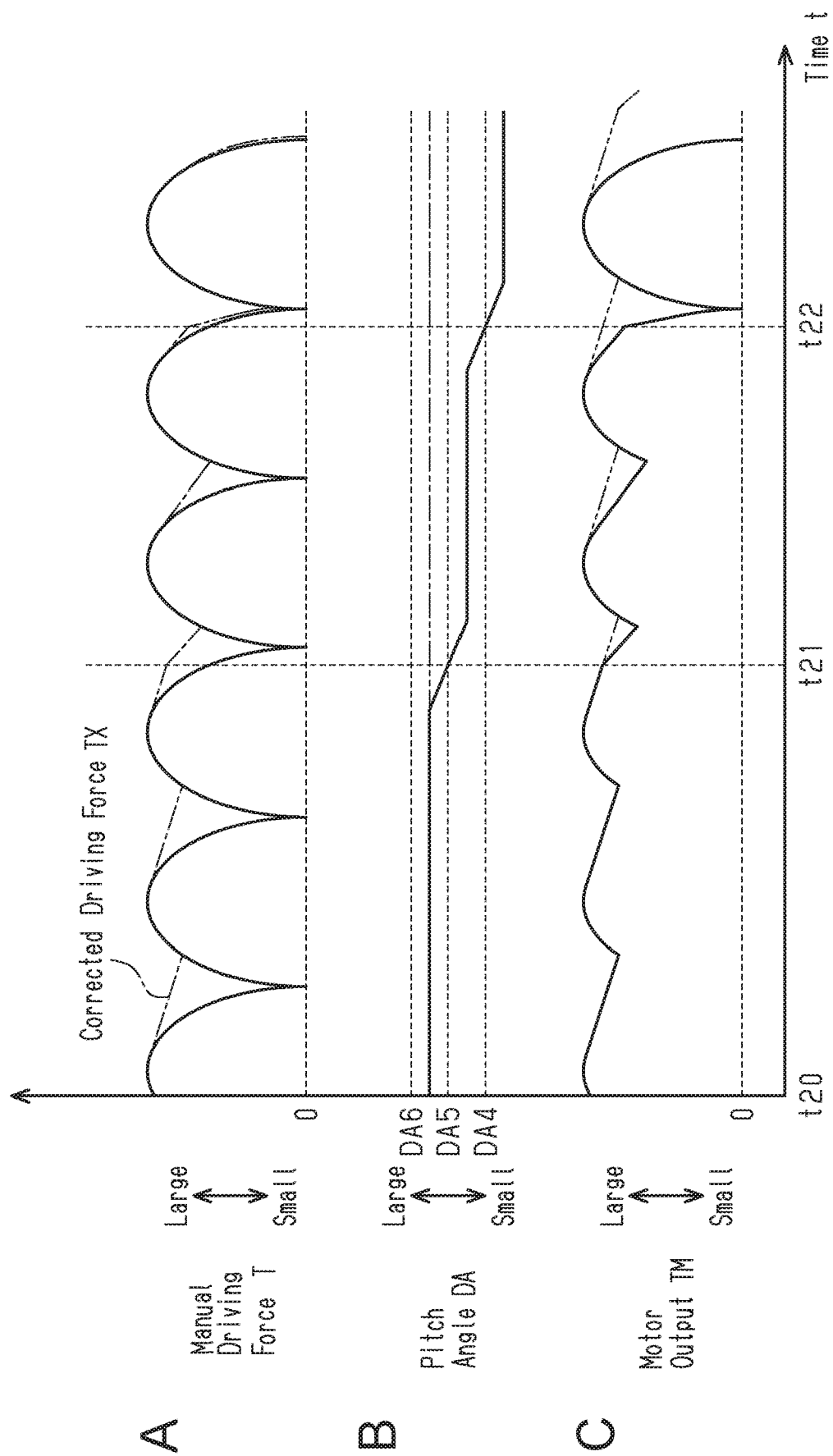
FIG. 6 is a series of timing charts in accordance with one example of the motor control in the second mode.

With reference to FIG. 6, one example of the motor control in a case in which the second mode is selected will now be described. Timing chart A of FIG. 6 shows the relationship of time and the manual driving force T. Timing chart B of FIG. 6 shows the relationship of time and the pitch angle DA. Timing chart C of FIG. 6 shows the relationship of time and the motor output TM. Further, the timing charts A to C of FIG. 6 show a state in which the crank rotation speed N is constant as the bicycle 10 travels. In the timing chart C of FIG. 6, the solid line represents the motor output TM in a case in which the inclination angle D changes as the bicycle 10 travels, and the double-dashed line represents the motor output TM in a case in which the inclination angle D does not change as the bicycle 10 travels.

In the timing charts A to C of FIG. 6, in the period from time t20 to t21, the pitch angle DA is less than or equal to the sixth pitch angle DA6 but greater than the fifth pitch angle DA5. During this period, in a case in which the manual driving force T is greater than the corrected driving force TX, if the manual driving force T is increased, then the motor output TM is changed at an increase rate that is substantially equal to the increase rate of the manual driving force T. If the manual driving force T is decreased, then the motor output TM is decreased at a decrease rate that is more gradual than the decrease rate of the manual driving force T.

At time t21, the pitch angle DA becomes less than or equal to the fifth pitch angle DA5 but is greater than the fourth pitch angle DA4. Here, the electronic control unit 32 decreases the time constant K in accordance with the pitch angle DA. Thus, the decrease rate of the corrected driving force TX is increased, and the decrease rate of the corrected driving force TX approaches the decrease rate of the manual driving force T. Further, the decrease rate of the motor output TM approaches the decrease rate of the manual driving force T. That is, the response speed R of the motor 22 is increased with respect to a change in the manual driving force T. In a case in which the pitch angle DA remains less than or equal to the fifth pitch angle DA5 and greater than the fourth pitch angle DA4, if the manual driving force T decreases, then the electronic control unit 32 controls the motor 22 with a fixed response speed R.

At time t22, the pitch angle DA becomes less than or equal to the fourth pitch angle DA4. Here, the electronic control unit 32 sets the time constant K to "0." Thus, the decrease rate of the corrected driving force TX is increased, and the decrease rate of the corrected driving force TX becomes substantially equal to the decrease rate of the manual driving force T. Further, the decrease rate of the motor output TM becomes substantially equal to the decrease rate of the manual driving force T. That is, the response speed R of the motor 22 is increased with respect to a change in the manual driving force T. In a case in which the pitch angle DA remains less than or equal to the fourth pitch angle DA4, the electronic control unit 32 controls the motor 22 with a fixed response speed R.

The advantages of the bicycle controller 30 will now be described.

The bicycle controller 30 keeps the motor output TM high in a case in which the inclination angle D is large on an uphill. This reduces the load on the rider in a case in which the rider rides the bicycle 10 on an uphill. The bicycle controller 30 changes the motor output TM with a high responsivity in accordance with changes in the manual driving force T on a downhill or an even road. This allows the rider to easily control the bicycle 10 while riding downhill or on an even road.

The force acting on the rear of the bicycle 10 in a case in which the bicycle 10 travels off-road on a bumpy uphill is greater than that in a case in which the bicycle 10 is traveling on an even uphill. In such a case, as long as the first mode is selected, the bicycle controller 30 will function so that the rider hardly notices any lack in the motor output TM.

Second Embodiment

With reference to FIGS. 1 and 7 to 9, a second embodiment of the bicycle controller 30 will now be described. The second embodiment of the bicycle controller 30 is similar to the first embodiment of the bicycle controller 30 except in that a response speed Q of the motor 22 changes in accordance with the inclination angle D even in a case in which the manual driving force T increases. Same reference numerals are given to those components that are the same as the corresponding components of the first embodiment. Such components will not be described in detail.

In a case in which the manual driving force T increases, the electronic control unit 32 changes the response speed of the motor 22. The response speed of the motor 22 in a case in which the manual driving force T increases is referred to as the response speed Q. The electronic control unit 32 can change the response speed Q in a stepped manner in accordance with the inclination angle D of the bicycle 10. Alternatively, the electronic control unit 32 can change the response speed Q in a continuous manner in accordance with the inclination angle D of the bicycle 10.

In a case in which the inclination angle D of the bicycle 10 increases on an uphill, the electronic control unit 32 increases the response speed Q. In a case in which the inclination angle D of the bicycle 10 increases on an uphill, the electronic control unit 32 increases the response speed Q of the motor 22 as the manual driving force T increases. In a case in which the inclination angle D of the bicycle 10 becomes greater than or equal to a first angle D1 on an uphill, the electronic control unit 32 fixes the response speed Q if the manual driving force T increases.

In a case in which the inclination angle D of the bicycle 10 increases on a downhill, the electronic control unit 32 decreases the response speed Q. In a case in which the inclination angle D of the bicycle 10 increases on a downhill, the electronic control unit 32 decreases the response speed Q as the manual driving force T increases. In a case in which the inclination angle D of the bicycle 10 becomes greater than or equal to a second angle D2 on a downhill, the electronic control unit 32 fixes the response speed Q if the manual driving force T increases.

The memory 34 stores a third map and a fourth map that set the relationship of the increase rate of the manual driving force T, the inclination angle D, and a corrected value CX. In a case in which the manual driving force T increases, the electronic control unit 32 adds the corrected value CX to the manual driving force T or multiplies the manual driving force T by the corrected value CX to calculate a corrected driving force TX.

The third map sets the corrected value CX for cases in which the manual driving force T increases in the first mode. In one example, in the third map, the corrected value CX is set to increase as the increase rate of the manual driving force T increases. Further, the corrected value CX is set to increase as the pitch angle DA increases. The fourth map sets the corrected value CX for cases in which the manual driving force T increases in the second mode. In one example, in the fourth map, the corrected value CX is set to increase as the increase rate of the manual driving force T increases. Further, the corrected value CX is set to decrease as the pitch angle DA increases. In the third map, regardless of the increase rate of the manual driving force T, the corrected value CX can be set to increase as the pitch angle DA increases. In the fourth map, regardless of the increase rate of the manual driving force T, the corrected value CX can be set to decrease as the pitch angle DA decreases.

In a case in which the electronic control unit 32 adds the corrected value CX to the manual driving force T to calculate the corrected driving force TX, in the third and fourth maps, if the increase rate of the manual driving force T is less than a predetermined speed, then the corrected value CX can be a negative value. In a case in which the electronic control unit 32 multiples the manual driving force T by the corrected value CX to calculate the corrected driving force TX, in the third and fourth maps, if the increase rate of the manual driving force T is less than a predetermined speed, then the corrected value CX can be less than 1.

Figure 7:
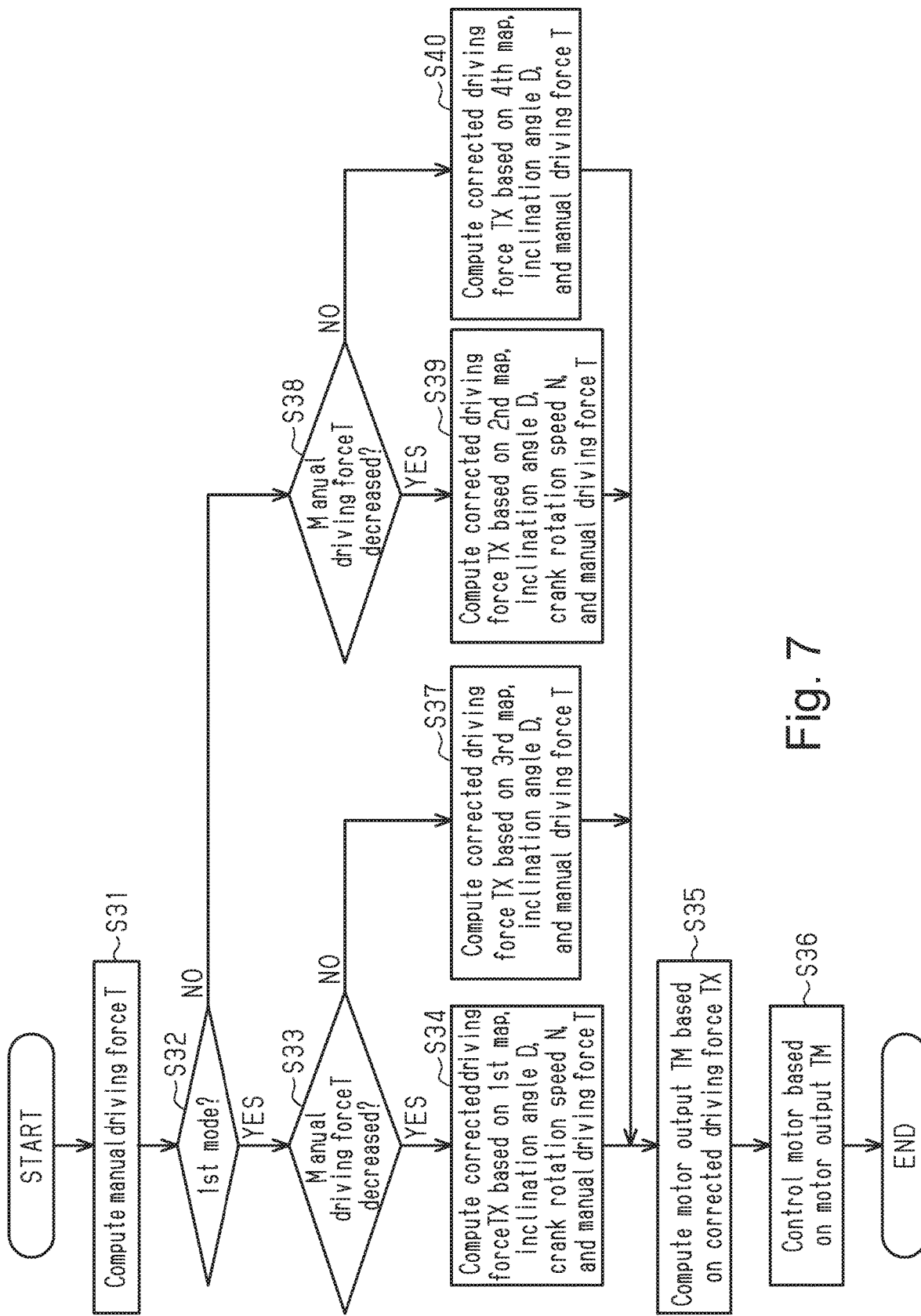
FIG. 7 is a flowchart of a motor control executed by the electronic control unit in accordance with a second embodiment.

With reference to FIG. 7, the motor control executed by the electronic control unit 32 will now be described. In a state in which the electronic control unit 32 is being supplied with power, the motor control is executed in predetermined cycles. In step S31, the electronic control unit 32 calculates the manual driving force T. In step S32, the electronic control unit 32 determines whether or not the present riding mode is the first mode. The electronic control unit 32 proceeds to step S33 if the electronic control unit 32 determines that the riding mode is the first mode.

In step S33, the electronic control unit 32 determines whether or not the manual driving force T is decreasing. If the electronic control unit 32 determines that the manual driving force T is decreasing, then the electronic control unit 32 proceeds to step S34. In step S34, the electronic control unit 32 calculates the corrected driving force TX based on the first map, the inclination angle D, the crank rotation speed N, and the manual driving force T and then proceeds to step S35. In step S35, the electronic control unit 32 calculates the motor output TM based on the calculated corrected driving force TX and proceeds to step S36. In step S36, the electronic control unit 32 controls the motor 22 based on the motor output TM and then executes the processing from step S31 again after a predetermined cycle.

If the electronic control unit 32 determines in step S33 that the manual driving force T is increasing or not changing, then the electronic control unit 32 proceeds to step S37. In step S37, the electronic control unit 32 calculates the corrected driving force TX based on the third map, the inclination angle D, and the manual driving force T and then proceeds to step S35. More specifically, the electronic control unit 32 calculates the corrected driving force TX by adding the corrected value CX, which is set in the third map, to the increase rate of the manual driving force T or multiplying the increase rate of the manual driving force T by the corrected value CX, which is set in the third map. In step S35, the electronic control unit 32 calculates the motor output TM based on the calculated corrected driving force TX and then proceeds to step S36. In step S36, the electronic control unit 32 controls the motor 22 based on the motor output TM and then executes the processing from step S31 again after a predetermined cycle.

If the electronic control unit 32 determines in step S32 that the present riding mode is not the first mode, that is, the present riding mode is the second mode, then the electronic control unit 32 proceeds to step S38. In step S38, the electronic control unit 32 determines whether or not the manual driving force T is decreasing. If the electronic control unit 32 determines that the manual driving force T is decreasing, then the electronic control unit 32 proceeds to step S39. In step S39, the electronic control unit 32 calculates the corrected driving force TX based on the second map, the inclination angle D, the crank rotation speed N, and the manual driving force T and then proceeds to step S35. In step S35, the electronic control unit 32 calculates the motor output TM based on the calculated corrected driving force TX and proceeds to step S36. In step S36, the electronic control unit 32 controls the motor 22 based on the motor output TM and then executes the processing from step S31 again after a predetermined cycle.

If the electronic control unit 32 determines in step S38 that the manual driving force T is increasing, then the electronic control unit 32 proceeds to step S40. In step S40, the electronic control unit 32 calculates the corrected driving force TX based on the fourth map, the inclination angle D, and the manual driving force T and then proceeds to step S35. More specifically, the electronic control unit 32 calculates the corrected driving force TX by adding the corrected value CX, which is set in the fourth map, to the increase rate of the manual driving force T or multiplying the increase rate of the manual driving force T by the corrected value CX, which is set in the fourth map. In step S35, the electronic control unit 32 calculates the motor output TM based on the calculated corrected driving force TX and then proceeds to step S36. In step S36, the electronic control unit 32 controls the motor 22 based on the motor output TM and then executes the processing from step S31 again after a predetermined cycle.

Figure 8:
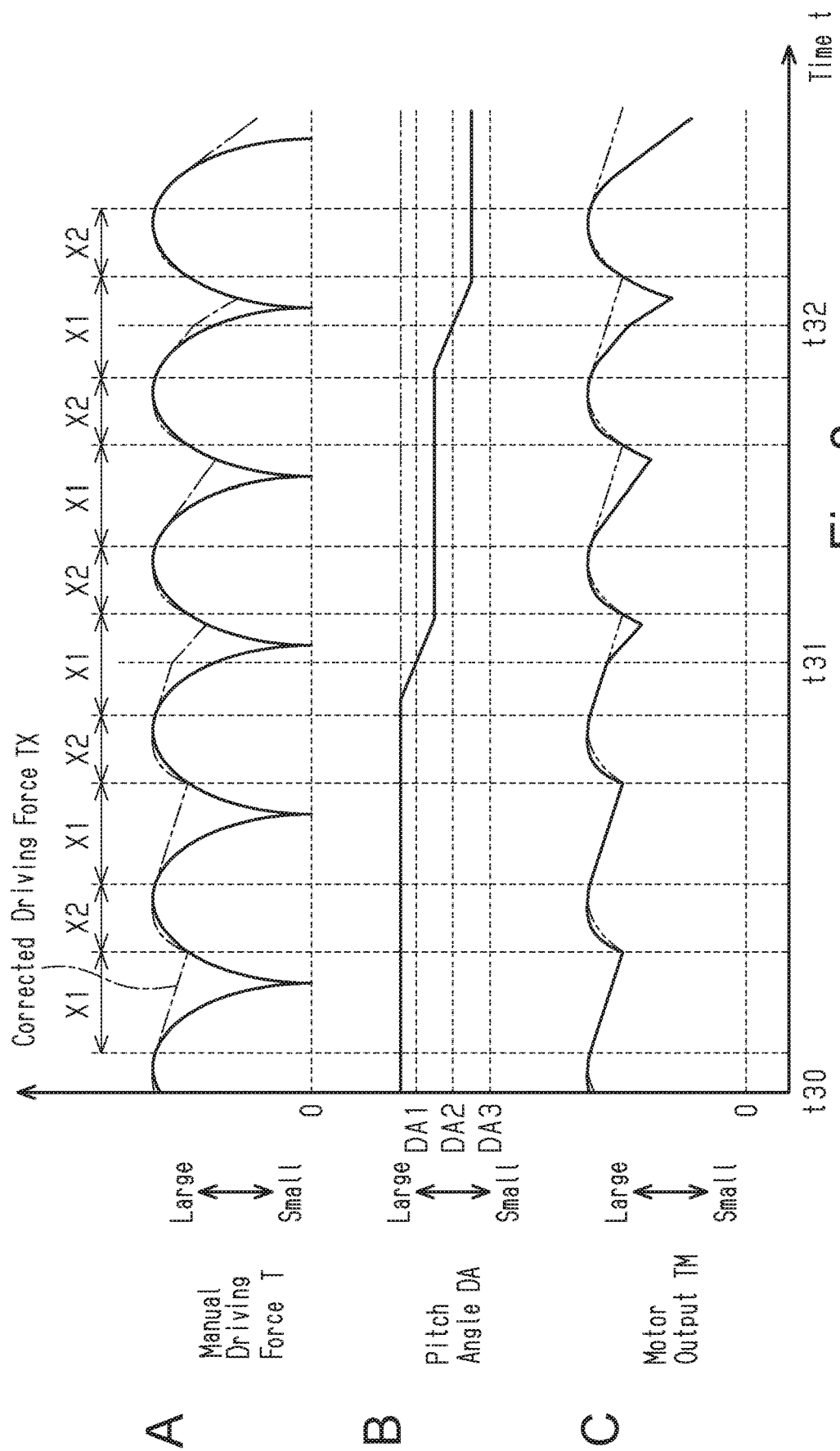
FIG. 8 is a series of timing charts in accordance with one example of the motor control in a first mode of the second embodiment.

Referring to FIG. 8, one example of the motor control in a case in which the first mode is selected will now be described. Timing chart A of FIG. 8 shows the relationship of time and the manual driving force T. Timing chart B of FIG. 8 shows the relationship of time and the pitch angle DA. Timing chart C of FIG. 8 shows the relationship of time and the motor output TM. The timing charts A to C of FIG. 8 show a state in which the bicycle 10 is travelling with the crank rotation speed N kept constant. The solid line in the timing chart C of FIG. 8 shows the motor output TM in a case in which the inclination angle D changes while travelling. The double-dashed line in the timing chart C of FIG. 8 shows the motor output TM in a case in which the inclination angle D does not change while travelling.

In the period from time t30 to t31 in the timing charts A to C of FIG. 8, the pitch angle DA is greater than or equal to a first pitch angle DA1. In the period from time t30 to time t31, during period X1 in which the corrected driving force TX decreases, the manual driving force T and the motor output TM change in the same manner as from time t11 to time t12 in the timing charts A to C of FIG. 5. In the period from time t30 to time t31, during period X2 in which the corrected driving force TX increases, that is, the crank arms 12 (refer to FIG. 1) are rotated from the top dead center or the bottom dead center to an intermediate angle between the top dead center and the bottom dead center, the motor output TM is changed at an increase rate that is greater than the increase rate of the manual driving force T.

Time t31 is the time at which the pitch angle DA becomes less than or equal to the first pitch angle DA1 and greater than the second pitch angle DA2. In the period from time t31 to time t32, during period X1 in which the corrected driving force TX decreases, the manual driving force T and the motor output TM change in a manner similar to time t11 to time t12 in the timing charts A and C of FIG. 5. In the period from time t31 to time t32, during period X2 in which the corrected driving force TX increases, the electronic control unit 32 decreases the response speed Q in accordance with the pitch angle DA. The increase rate of the corrected driving force TX is less than that of the period from time t30 to time t31.

Time t32 is the time at which the pitch angle DA becomes less than or equal to the second pitch angle DA2 but greater than the third pitch angle DA3. From time t32, during period X1 in which the corrected driving force TX decreases, the manual driving force T and the motor output TM change in a manner similar to from time t12 in timing charts A and C of FIG. 5. From time t32, during period X2 in which the corrected driving force TX increases, the electronic control unit 32 decreases the response speed Q in accordance with the pitch angle DA. Thus, the increase rate of the corrected driving force TX becomes less than that of the period from time t31 to time t32.

Figure 9:
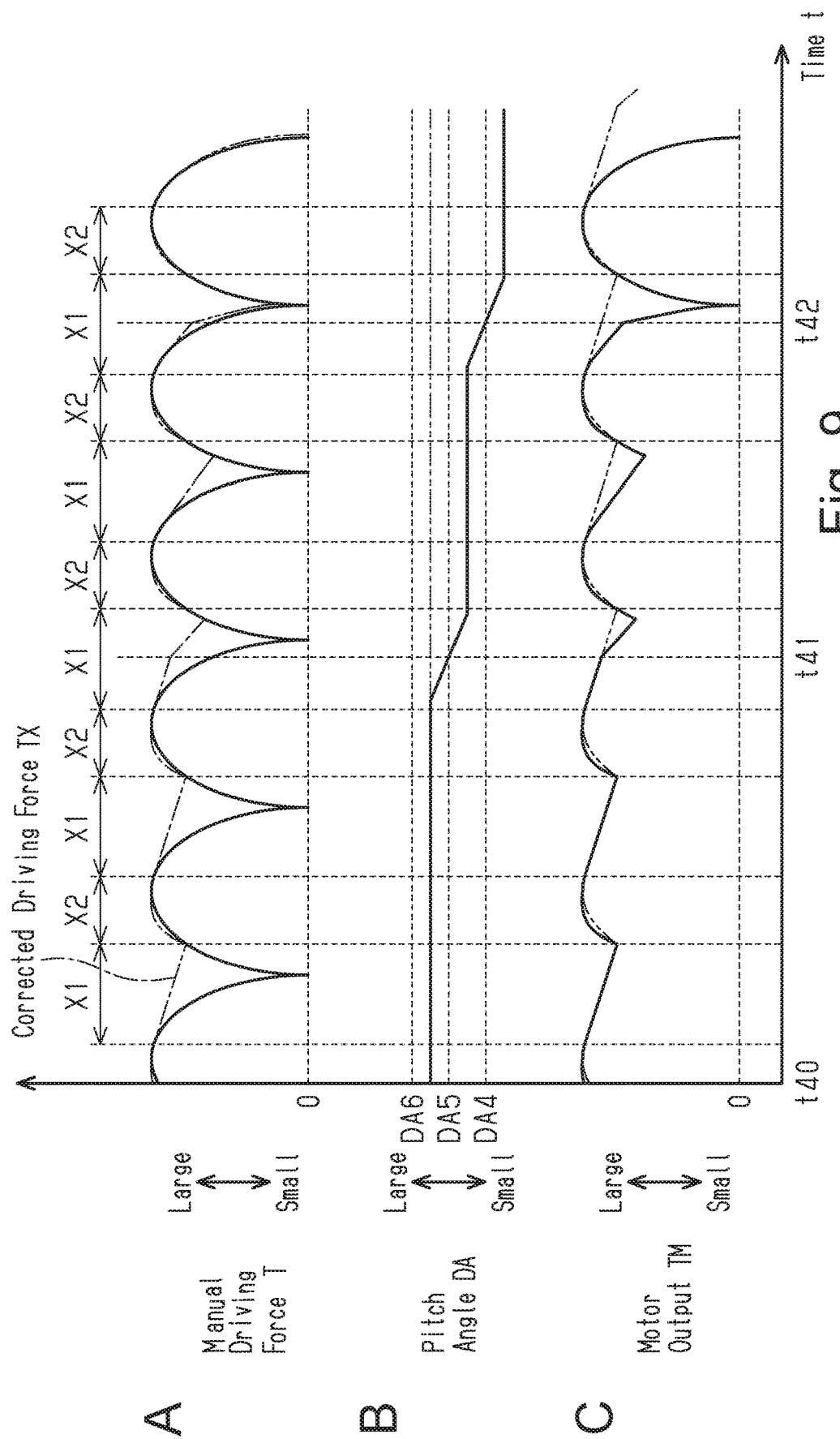
FIG. 9 is a series of timing charts in accordance with one example of the motor control in a second mode of the second embodiment.

Referring to FIG. 9, one example of the motor control in a case in which the second mode is selected will now be described. Timing chart A of FIG. 9 shows the relationship of time and the manual driving force T. Timing chart B of FIG. 9 shows the relationship of time and the pitch angle DA. Timing chart C of FIG. 9 shows the relationship of time and the motor output TM. The timing charts A to C of FIG. 9 show a state in which the bicycle 10 is travelling with the crank rotation speed N kept constant. The solid line in the timing chart C of FIG. 9 shows one example of the execution of the motor control in a case in which the inclination angle D changes while travelling. The double-dashed line in the timing chart C of FIG. 9 shows one example of the motor control in a case in which the inclination angle D does not change while travelling.

In the period from time t40 to t41 in the timing charts A to C of FIG. 9, the pitch angle DA becomes less than or equal to the sixth pitch angle DA6 but greater than the fifth pitch angle DA5. In the period from time t40 to time t41, during period X1 in which the corrected driving force TX decreases, the manual driving force T and the motor output TM change in the same manner as from time t21 to time t22 in the timing charts A to C of FIG. 6. In the period from time t40 to time t41, during period X2 in which the corrected driving force TX increases, that is, the crank arms 12 (refer to FIG. 1) are rotated from the top dead center or the bottom dead center to an intermediate angle between the top dead center and the bottom dead center, the motor output TM is changed at an increase rate that is greater than the increase rate of the manual driving force T.

Time t41 is the time at which the pitch angle DA becomes less than or equal to the fifth pitch angle DA5 but greater than the fourth pitch angle DA4. In the period from time t41 to time t42, during period X1 in which the corrected driving force TX decreases, the manual driving force T and the motor output TM change in a manner similar to time t21 to time t22 in the timing charts A and C of FIG. 6. In the period from time t41 to time t42, during period X2 in which the corrected driving force TX increases, the electronic control unit 32 decreases the response speed Q in accordance with the pitch angle DA. The increase rate of the corrected driving force TX during period X2 is less than that of the corrected driving force TX period from time t40 to time t41.

Time t42 is the time at which the pitch angle DA becomes less than or equal to the fourth pitch angle DA4. From time t42, during period X1 in which the corrected driving force TX decreases, the manual driving force T and the motor output TM change in a manner similar to from time t22 in timing charts A to C of FIG. 6. From time t42, during period X2 in which the corrected driving force TX increases, the electronic control unit 32 decreases the response speed Q in accordance with the pitch angle DA. Thus, the increase rate of the corrected driving force TX becomes less than that of the period from time t41 to time t42.

Third Embodiment

A third embodiment of the bicycle controller 30 will now be described with reference to FIGS. 1, 10, and 11. The third embodiment of the bicycle controller 30 is similar to the first embodiment of the bicycle controller 30 except in that a control is executed to change the response speed Q in accordance with the vehicle speed V and the inclination angle D. Same reference numerals are given to those components that are the same as the corresponding components of the first embodiment. Such components will not be described in detail.

In the present embodiment, the electronic control unit 32 shown in FIG. 1 sets the response speeds R and Q for cases in which the vehicle speed V of the bicycle 10 is less than or equal to a first speed V1 to be different from the response speeds R and Q for cases in which the vehicle speed V of the bicycle 10 exceeds the first speed V1. Preferably, the first speed V1 is set at the vehicle speed V that allows for determination that the bicycle 10 has started to travel. Preferably, the first speed V1 is set in a range from 1 to 10 km/h. In one example, the first speed V1 is set to 3 km/h. Preferably, the first speed V1 is stored beforehand in the memory 34. The memory 34 is configured so that the first speed V1 can be changed. For example, operation of the operation unit 14 or use of an external device changes the first speed V1 stored in the memory 34. The electronic control unit 32 sets the response speed Q for a case in which the vehicle speed V of the bicycle 10 is less than or equal to the first speed V1 to be higher than the response speed Q for a case in which the vehicle speed V of the bicycle 10 exceeds the first speed V1. Further, the electronic control unit 32 sets the response speed R for a case in which the vehicle speed V of the bicycle 10 is less than or equal to the first speed V1 to be lower than the response speed R for a case in which the vehicle speed V of the bicycle 10 exceeds the first speed V1.

The electronic control unit 32 sets the response speeds R and Q for a case during a predetermined period PX1 from the time at which the bicycle 10 starts to travel to be different from the response speeds R and Q for a case in which the predetermined period PX1 has elapsed. Preferably, the predetermined period PX1 is set in the range of one to ten seconds. In one example, the predetermined period PX1 is set to three seconds. Preferably, the predetermined period PX1 is stored beforehand in the memory 34. The memory 34 is configured to allow the predetermined period PX1 to be changed. For example, operation of the operation unit 14 or use of an external device changes the predetermined period PX1 stored in the memory 34. The electronic control unit 32 sets the response speed Q for a case during the predetermined period PX1 from the time at which the bicycle 10 starts to travel to be higher than the response speed Q for a case in which the predetermined period PX1 has elapsed. The electronic control unit 32 sets the response speed R for a case during the predetermined period PX1 from the time at which the bicycle 10 starts to travel to be lower than the response speed R for a case in which the predetermined period PX1 has elapsed.

If the inclination angle D on an uphill increases, then the electronic control unit 32 decreases the response speed R in a case in which the manual driving force T decreases and increases the response speed Q in a case in which the manual driving force T increases. More specifically, on an uphill in which the pitch angle DA is greater than a first predetermined angle DX1, the electronic control unit 32 increases the response speed Q if the manual driving force T increases. The first predetermined angle DX1 is set to a positive value, in one example, nine degrees.

If the inclination angle D on a downhill increases, then the electronic control unit 32 increases the response speed R for a case in which the manual driving force T decreases and decreases the response speed Q for a case in which the manual driving force T increases. More specifically, on a downhill in which the pitch angle DA is less than a second predetermined angle D2, the electronic control unit 32 increases the response speed Q for a case in which the manual driving force T increases. The second predetermined angle D2 is set to a negative value, in one example, minus nine degrees.

Figure 10:
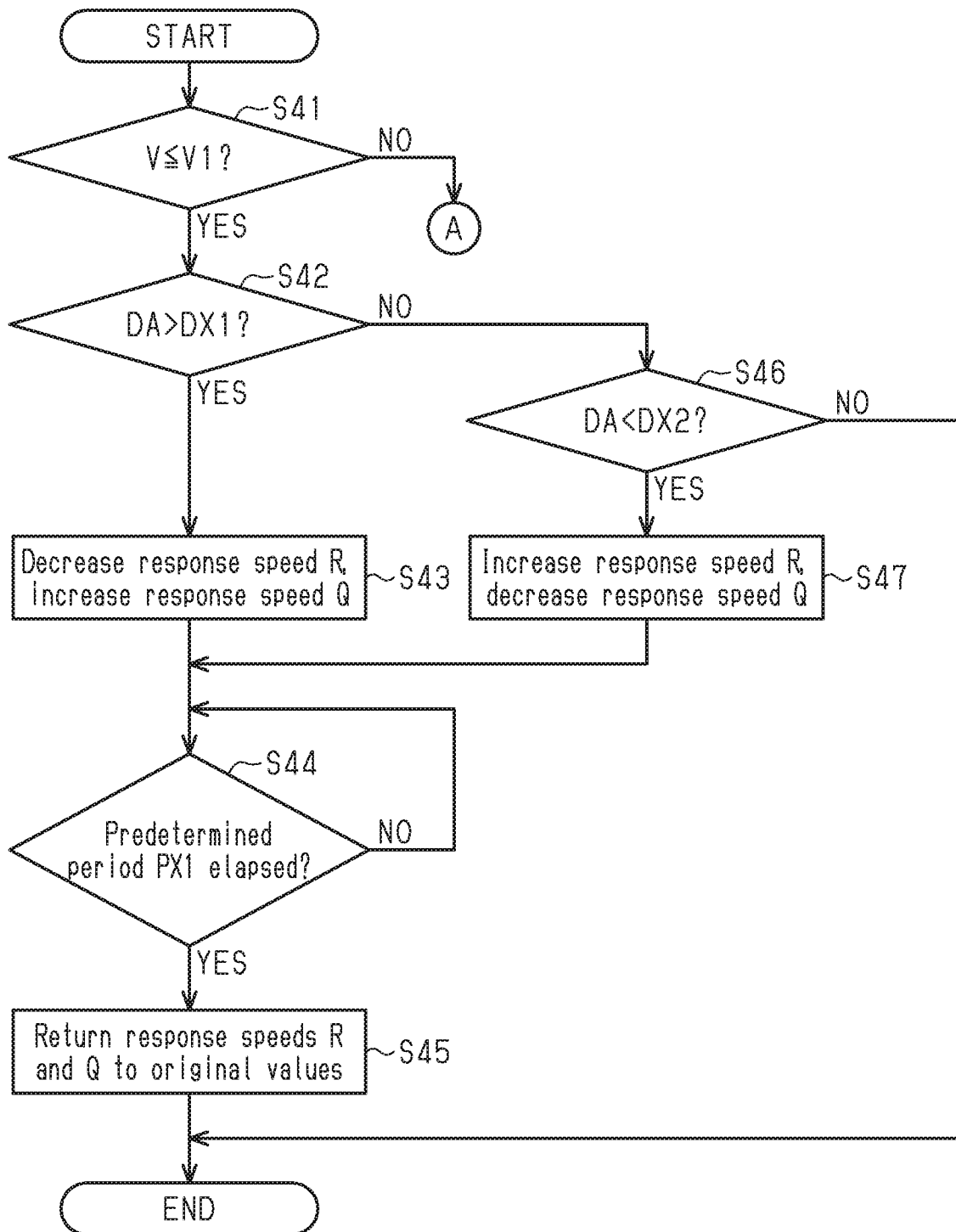
FIG. 10 is a first flowchart of a motor control executed by the electronic control unit in accordance with a third embodiment.
Figure 11:
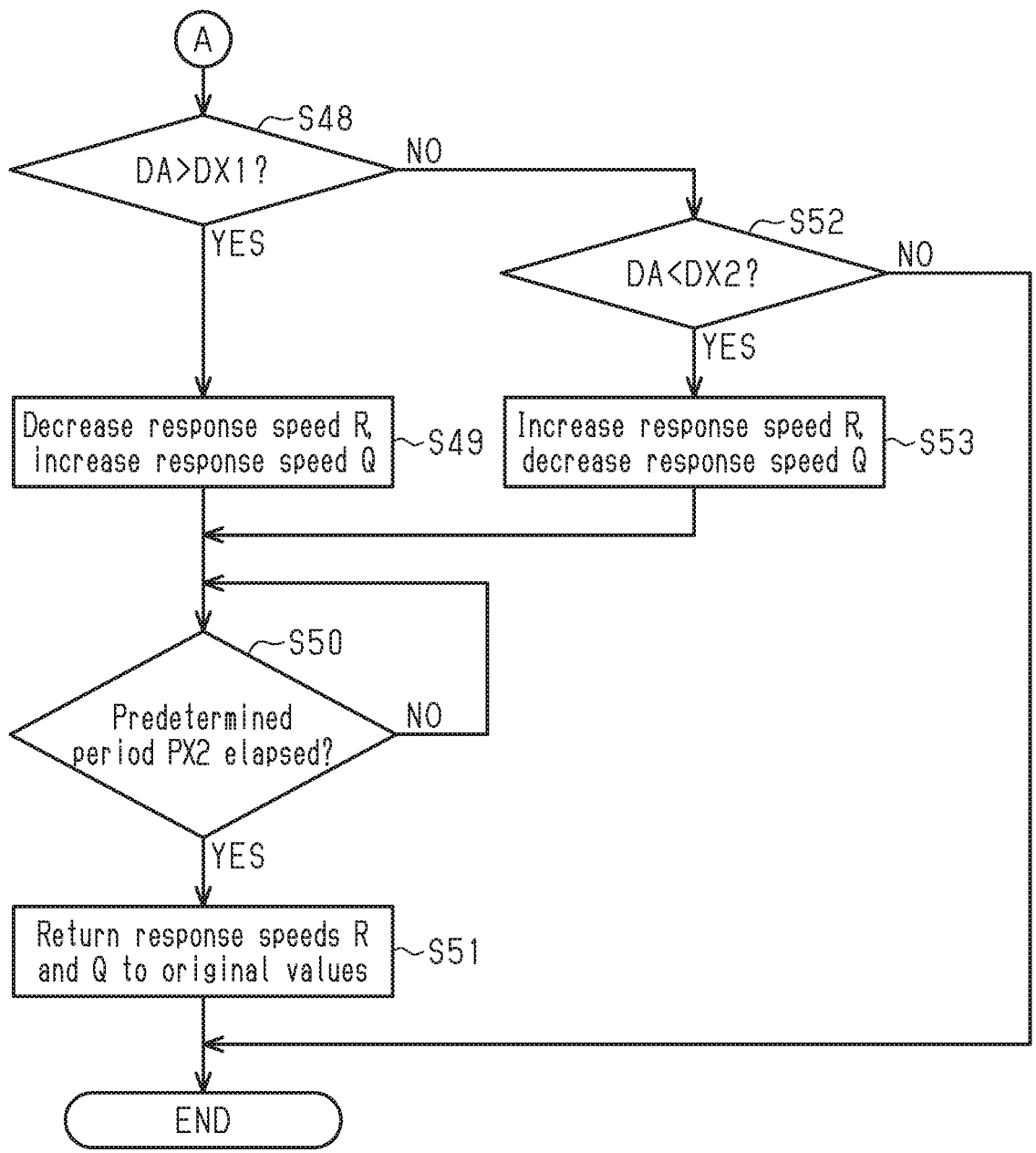
FIG. 11 is a second flowchart of the motor control executed by the electronic control unit in accordance with the third embodiment.
Figure 12:
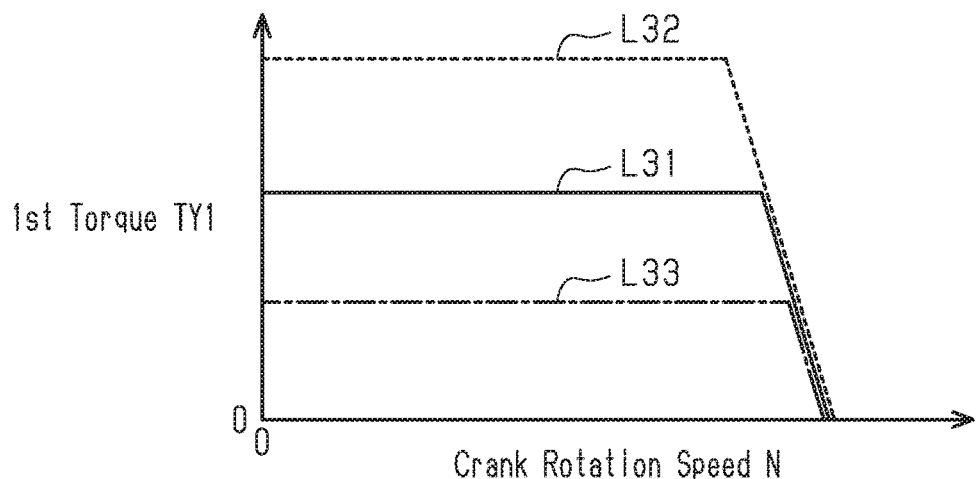
FIG. 12 is a graph in accordance with the relationship of a first torque and a rotation speed of a crank set by the electronic control unit in accordance with a fourth embodiment.

With reference to FIGS. 10 to 12, a motor control that changes the response speeds R and Q in accordance with the inclination angle D of the vehicle speed V will now be described. The motor control is repeated in predetermined cycles as long as the electronic control unit 32 is supplied with power.

In step S41, the electronic control unit 32 determines whether or not the vehicle speed V is less than or equal to the first speed V1. If the electronic control unit 32 determines that the vehicle speed V is less than or equal to the first speed V1, then the electronic control unit 32 proceeds to step S42. In step S42, the electronic control unit 32 determines whether or not the pitch angle DA is greater than the first predetermined angle DX1. If the electronic control unit 32 determines that the pitch angle DA is greater than the first predetermined angle DX1, then the electronic control unit 32 proceeds to step S43. In step S43, the electronic control unit 32 decreases the response speed R and increases the response speed Q. Then, the electronic control unit 32 proceeds to step S44. For example, the electronic control unit 32 decreases the response speed R to a value lower than an initial value RX of the response speed R that is stored beforehand in the memory 34, and the electronic control unit 32 increases the response speed Q to a value higher than an initial value QX of the response speed Q that is stored beforehand in the memory 34. Preferably, the initial values QX and RX of the response speeds Q and R are set to values that are suitable for traveling on an even road in a case in which the vehicle speed V is greater than the first speed V1.

In step S44, the electronic control unit 32 determines whether or not the predetermined period PX1 has elapsed. For example, if the elapsed time from the time at which the vehicle speed V was determined in step S41 as being less than or equal to the first speed V1 becomes greater than or equal to the predetermined period PX1, then the electronic control unit 32 determines that the predetermined period PX1 has elapsed. The electronic control unit 32 repeats the determination of step S44 until the predetermined period PX1 elapses. Preferably, the predetermined period PX1 is set in a range of one to ten seconds. In one example, the predetermined period PX1 is set to three seconds. If the predetermined period PX1 elapses, then the electronic control unit 32 proceeds to step S45. In step S45, the electronic control unit 32 returns the response speed R and the response speed Q to their original values. The process of step S45 sets the response speed R and the response speed Q to the response speed R and the response speed Q prior to the change in step S43. For example, the electronic control unit 32 returns the response speed R and the response speed Q to the initial values QX and RX stored in the memory 34.

If the electronic control unit 32 determines in step S42 that the pitch angle DA is not greater than the first predetermined angle DX1, then the electronic control unit 32 proceeds to step S46. In step S46, the electronic control unit 32 determines whether or not the pitch angle DA is less than the second predetermined angle D2. If the electronic control unit 32 determines that the pitch angle DA is greater than or equal to the second predetermined angle D2, then the electronic control unit 32 ends the processing. Thus, in a case in which the bicycle 10 is on a road in which the pitch angle DA is less than or equal to the first predetermined angle DX1 and greater than or equal to the second predetermined angle D2, the electronic control unit 32 ends the processing without changing the response speeds R and Q.

If the electronic control unit 32 determines that the pitch angle DA is less than the second predetermined angle D2 in step S46, then the electronic control unit 32 proceeds to step S47. In step S47, the electronic control unit 32 increases the response speed R and decreases the response speed Q. Then, the electronic control unit 32 proceeds to step S44. For example, the electronic control unit 32 increases the response speed R to a value higher than the initial value RX of the response speed R that is stored beforehand in the memory 34 and decreases the response speed Q to a value lower than the initial value QX of the response speed Q that is stored beforehand in the memory 34. If the electronic control unit 32 determines in step S46 that the pitch angle DA is less than the second predetermined angle D2, then the electronic control unit 32 increases the response speed R and lowers the response speed Q in step S47. Then, the electronic control unit 32 proceeds to step S44.

In step S44, the electronic control unit 32 determines whether or not the predetermined period PX1 has elapsed. For example, the electronic control unit 32 determines that the predetermined period PX1 has elapsed in a case in which the elapsed period from the time at which the electronic control unit 32 determines in step S41 that the vehicle speed V has become less than or equal to the first speed V1 becomes greater than or equal to the predetermined period PX1. The electronic control unit 32 repeats the determination of step S44 until the predetermined period PX1 elapses. If the predetermined period PX1 has elapsed, then the electronic control unit 32 proceeds to step S45. In step S45, the electronic control unit 32 returns the response speed R and the response speed Q to their original values. The process of step S45 sets the response speed R and the response speed Q to the response speed R and the response speed Q prior to the change in step S47. For example, the electronic control unit 32 returns the response speed R and the response speed Q to the initial values QX and RX stored in the memory 34.

If the electronic control unit 32 determines in step S41 that the vehicle speed V is greater than the first speed V1, then the electronic control unit 32 proceeds to step S48. In step S48, the electronic control unit 32 determines whether or not the pitch angle DA is greater than the first predetermined angle DX1. If the electronic control unit 32 determines that the pitch angle DA is greater than the first predetermined angle DX1, then the electronic control unit 32 proceeds to step S49. In step S49, the electronic control unit 32 decreases the response speed R and increases the response speed Q. Then, the electronic control unit 32 proceeds to step S50. For example, the electronic control unit 32 decreases the response speed R to a value lower than the initial value RX of the response speed R that is stored beforehand in the memory 34, and the electronic control unit 32 increases the response speed Q to a value higher than the initial value QX of the response speed Q that is stored beforehand in the memory 34. The electronic control unit 32 sets the response speed R and the response speed Q to values differing from those set in step S43. For example, the response speed R set in step S43 by the electronic control unit 32 is lower than the response speed R set in step S49, and the response speed Q set in step S43 by the electronic control unit 32 is higher than the response speed Q set in step S49.

In step S50, the electronic control unit 32 determines whether or not a predetermined period PX2 has elapsed. More specifically, the electronic control unit 32 determines that the predetermined period PX2 has elapsed in a case in which the elapsed period from the time at which the electronic control unit 32 changes the response speeds R and Q in step S49 becomes greater than or equal to the predetermined period PX2. Preferably, the predetermined period PX2 is set in a range of one to ten seconds. In one example, the predetermined period PX2 is set to three seconds. Preferably, the predetermined period PX2 is stored beforehand in the memory 34. The memory 34 is configured to allow the predetermined period PX2 to be changed. For example, operation of the operation unit 14 or use of an external device changes the predetermined period PX2 stored in the memory 34. The electronic control unit 32 repeats the determination of step S50 until the predetermined period PX2 elapses. If the predetermined period PX2 elapses, then the electronic control unit 32 proceeds to step S51. In step S51, the electronic control unit 32 returns the response speed R and the response speed Q to their original values. The process of step S51 sets the response speed R and the response speed Q to the response speed R and the response speed Q prior to the change in step S49. For example, the electronic control unit 32 returns the response speed R and the response speed Q to the initial values QX and RX stored in the memory 34.

If the electronic control unit 32 determines in step S48 that the pitch angle DA is not greater than the first predetermined angle DX1, then the electronic control unit 32 proceeds to step S52. In step S52, the electronic control unit 32 determines whether or not the pitch angle DA is less than the second predetermined angle D2. If the electronic control unit 32 determines that the pitch angle DA is greater than or equal to the second predetermined angle D2, then the electronic control unit 32 ends the processing. Thus, in a case in which the bicycle 10 is on a road in which the pitch angle DA is less than or equal to the first predetermined angle DX1 and greater than or equal to the second predetermined angle D2, the electronic control unit 32 ends the processing without changing the response speeds R and Q.

If the electronic control unit 32 determines that the pitch angle DA is less than the second predetermined angle D2 in step S52, then the electronic control unit 32 proceeds to step S53. In step S53, the electronic control unit 32 increases the response speed R and decreases the response speed Q. Then, the electronic control unit 32 proceeds to step S50. For example, the electronic control unit 32 increases the response speed R to a value higher than the initial value RX of the response speed R that is stored beforehand in the memory 34 and decreases the response speed Q to a value lower than the initial value QX of the response speed Q that is stored beforehand in the memory 34. For example, the response speed R set in step S53 by the electronic control unit 32 is higher than the response speed R set in step S49, and the response speed Q set in step S53 by the electronic control unit 32 is lower than the response speed Q set in step S49.

In step S50, the electronic control unit 32 determines whether or not the predetermined period PX2 has elapsed. More specifically, the electronic control unit 32 determines that the predetermined period PX2 has elapsed if the elapsed time from the time at which the response speeds R and Q are changed in step S53 becomes greater than or equal to the predetermined period PX2. The electronic control unit 32 repeats the determination of step S50 until the predetermined period PX2 elapses. If the predetermined period PX2 elapses, then the electronic control unit 32 proceeds to step S51.

Fourth Embodiment

Figure 13:
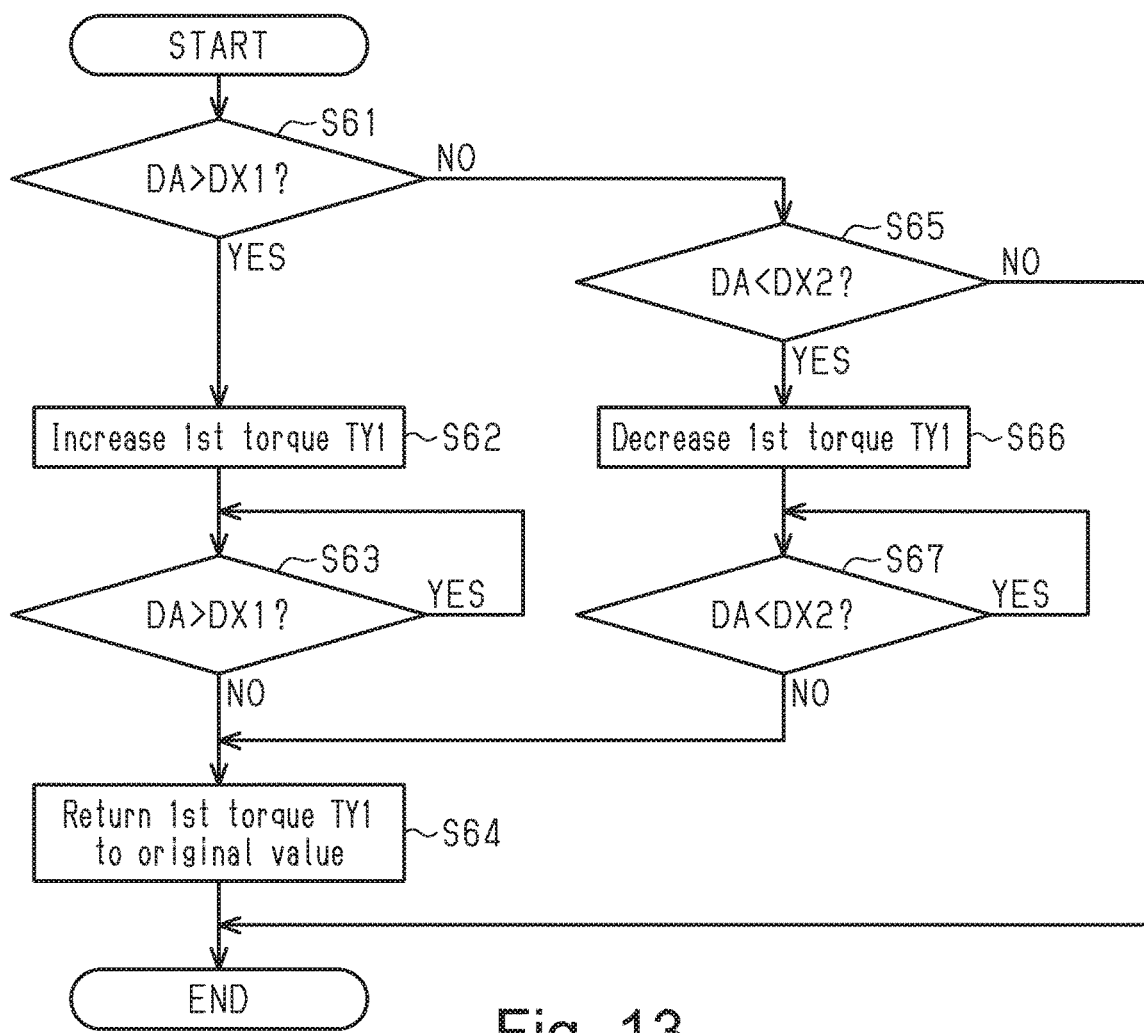
FIG. 13 is a flowchart of a motor control executed by the electronic control unit in accordance with the fourth embodiment.

With reference to FIGS. 1, 12, and 13, a fourth embodiment of the bicycle controller 30 will now be described. The fourth embodiment of the bicycle controller 30 is similar to the first embodiment of the bicycle controller 30 except in that a control is executed to change the output torque TA of the motor 22 in accordance with the inclination angle D. Same reference numerals are given to those components that are the same as the corresponding components of the first embodiment. Such components will not be described in detail.

In the present embodiment, the electronic control unit 32 shown in FIG. 1 is configured to control the motor 22 in accordance with the manual driving force T in a riding mode. Further, the electronic control unit 32 controls the motor 22 in accordance with the manual driving force T. In the riding mode, the electronic control unit 32 controls the output torque TA of the motor 22 so that the output torque TA is less than or equal to a predetermined torque TY. The predetermined torque TY is changed in accordance with the inclination angle D of the bicycle 10. The predetermined torque TY includes a first torque TY1. The first torque TY1 is set in accordance with the output characteristics of the motor 22. Further, the first torque TY1 is set to a value that is less than the upper limit torque of the output torque TA of the motor 22 and in the proximity of the upper limit torque.

In a case in which the electronic control unit 32 controls the motor 22 in accordance with the manual driving force T, the electronic control unit 32 controls the output torque TA of the motor 22 so that the output torque TA is less than or equal to the first torque TY1. The first torque TY1 is changed in accordance with the inclination angle D of the bicycle 10. The memory 34 stores a fifth map that sets the relationship of the first torque TY1 and the crank rotation speed N. The solid line L31 in FIG. 12 shows one example of the fifth map. Preferably, the first torque TY1 is set for each riding mode. If the inclination angle D of the bicycle 10 increases on an uphill, then the electronic control unit 32 increases the first torque TY1. If the inclination angle D of the bicycle 10 increases on a downhill, then the electronic control unit 32 decreases the first torque TY1.

With reference to FIG. 13, motor control that changes the first torque TY1 in accordance with the inclination angle D will now be described. The motor control is repeated in predetermined cycles as long as the electronic control unit 32 is supplied with power.

In step S61, the electronic control unit 32 determines whether or not the pitch angle DA is greater than the first predetermined angle DX1. If the electronic control unit 32 determines that the pitch angle DA is greater than the first predetermined angle DX1, then the electronic control unit 32 proceeds to step S62. In step S62, the electronic control unit 32 increases the first torque TY1 and then proceeds to step S63. More specifically, the electronic control unit 32 switches the control of the motor 22 from a control that uses the map shown by the solid line L31 in FIG. 12 setting the relationship of the first torque TY1 and the crank rotation speed N to a control that uses the map shown by the broken line L32 in FIG. 12 setting the relationship of the first torque TY1 and the crank rotation speed N.

In step S63, the electronic control unit 32 determines whether or not the pitch angle DA is greater than the first predetermined angle DX1. As long as the electronic control unit 32 determines in step S63 that the pitch angle DA is greater than the first predetermined angle DX1, the electronic control unit 32 repeats the determination of step S63. If the electronic control unit 32 determines in step S63 that the pitch angle DA is less than or equal to the first predetermined angle DX1, then the electronic control unit 32 proceeds to step S64 and returns the first torque TY1 to its original value. More specifically, the electronic control unit 32 switches the control of the motor 22 using the map setting the relationship of the first torque TY1 and the crank rotation speed N to the control executed prior to the switching in step S62.

If the electronic control unit 32 determines in step S61 that the pitch angle DA is less than or equal to the first predetermined angle DX1, then the electronic control unit 32 proceeds to step S65. In step S65, the electronic control unit 32 determines whether or not the pitch angle DA is less than the second predetermined angle D2. If the electronic control unit 32 determines that the pitch angle DA is less than the second predetermined angle D2, then the electronic control unit 32 proceeds to step S66. In step S66, the electronic control unit 32 decreases the first torque TY1 and proceeds to step S67. More specifically, the electronic control unit 32 switches the control of the motor 22 from a control that uses the map shown by the solid line L31 in FIG. 12 setting the relationship of the first torque TY1 and the crank rotation speed N to a control that uses the map shown by the single-dashed line L32 in FIG. 12 setting the relationship of the first torque TY1 and the crank rotation speed N.

In step S67, the electronic control unit 32 determines whether or not the pitch angle DA is less than the second predetermined angle D2. As long as the electronic control unit 32 determines in step S67 that the pitch angle DA is less than the second predetermined angle D2, the electronic control unit 32 repeats the determination of step S67. If the electronic control unit 32 determines in step S67 that the pitch angle DA is greater than or equal to the second predetermined angle D2, then the electronic control unit 32 proceeds to step S64 and returns the first torque TY1 to its original value. More specifically, the electronic control unit 32 switches the control of the motor 22 using the map setting the relationship of the first torque TY1 and the crank rotation speed N to the control executed prior to the switching in step S66.

If there are multiple riding modes, in which the ratio of the motor output TM to the manual driving force T differs for each riding mode, and the electronic control unit 32 increases the first torque TY1 in step S62, then the electronic control unit 32 preferably sets the first torque TY1 to the maximum torque of the motor output TM in the riding mode in which the ratio of the motor output TM to the manual driving force T is the largest. If there are multiple riding modes, in which the ratio of the motor output TM to the manual driving force T differs for each riding mode, and the electronic control unit 32 decreases the first torque TY1 in step S66, then the electronic control unit 32 preferably sets the first torque TY1 to the maximum torque of the motor output TM in the riding mode in which the ratio of the motor output TM to the manual driving force T is the smallest.

Fifth Embodiment

With reference to FIGS. 1, and 14 to 16, a fifth embodiment of the bicycle controller 30 will now be described. The fifth embodiment of the bicycle controller 30 is similar to the first embodiment of the bicycle controller 30 except in that a control is executed to drive the motor 22 in accordance with the operation of the operation unit 14. Same reference numerals are given to those components that are the same as the corresponding components of the first embodiment. Such components will not be described in detail.

In the present embodiment, the electronic control unit 32 is configured to switch between a riding mode and a walk mode in accordance with operation of the operation unit 14 shown in FIG. 1. The electronic control unit 32 controls the motor 22 in accordance with the operation of the operation unit 14. More specifically, in a case in which the operation unit 14 is operated to drive the motor 22 in the walk mode, the electronic control unit 32 starts driving the motor 22 if the manual driving force T is zero. In a case in which the electronic control unit 32 controls the motor 22 in accordance with the operation of the operation unit 14, the electronic control unit 32 controls the output torque TA of the motor 22 to be less than or equal to a second torque TY2. In a case in which the electronic control unit 32 controls the motor 22 in accordance with operation of the operation unit 14, the electronic control unit 32 controls the vehicle speed V to be less than or equal to a predetermined vehicle speed V. The electronic control unit 32 changes an increase rate of the output torque TA of the motor 22 in accordance with the inclination angle D of the bicycle 10. If the inclination angle D of the bicycle 10 increases on an uphill, then the electronic control unit 32 increases the increase rate of the output torque TA of the motor 22. If the inclination angle D of the bicycle 10 increases on a downhill, then the electronic control unit 32 decreases the increase rate of the output torque TA of the motor 22.

Figure 14:
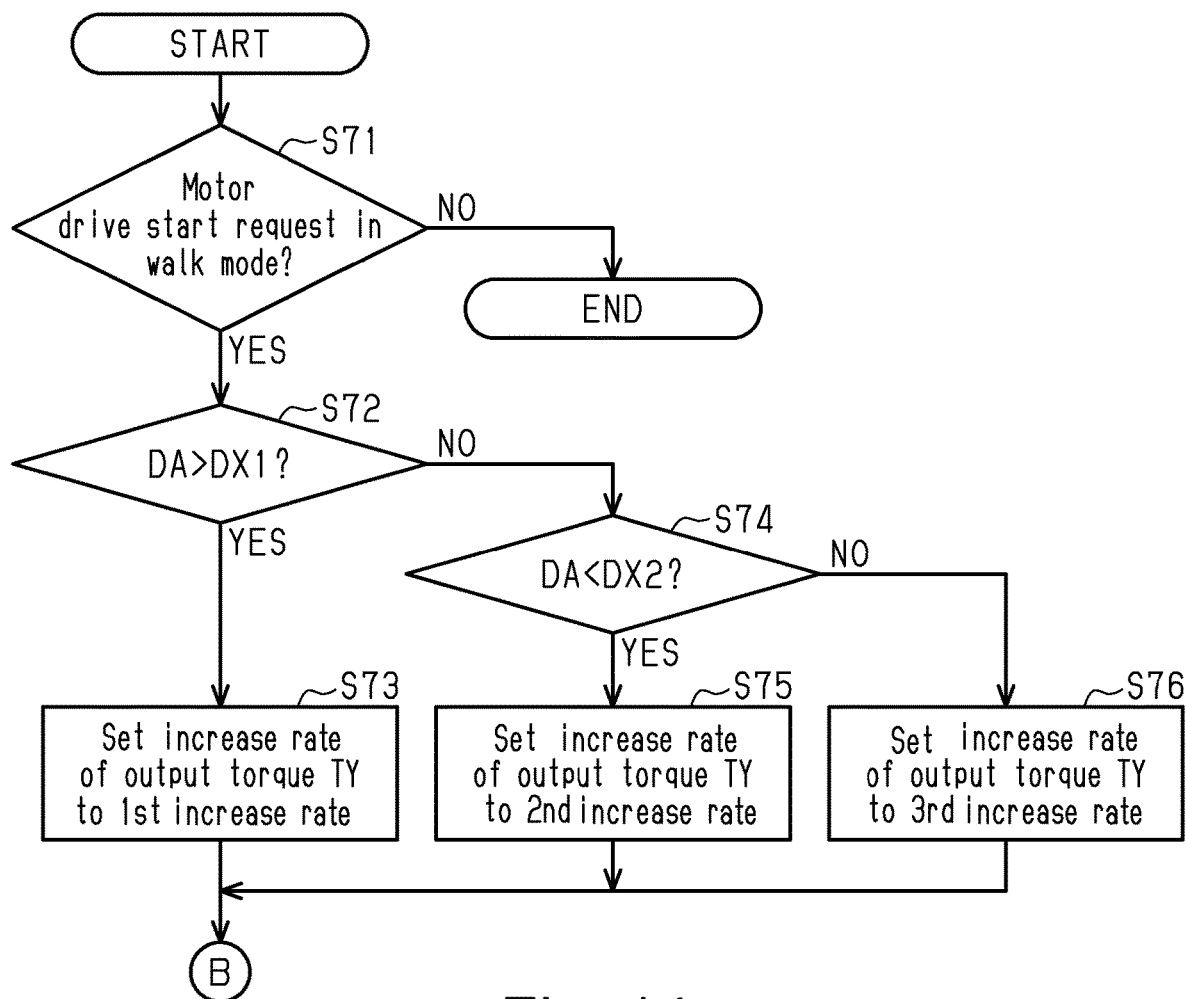
FIG. 14 is a first flowchart of a motor control executed by the electronic control unit in accordance with a fifth embodiment.
Figure 15:
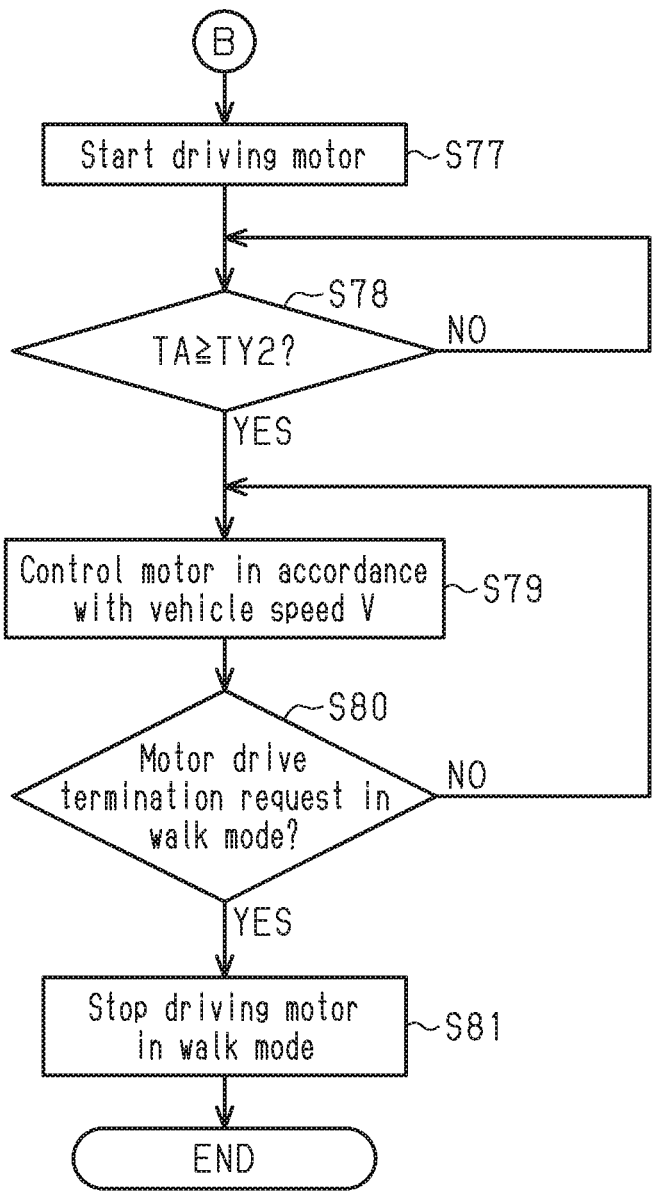
FIG. 15 is a second flowchart of the motor control executed by the electronic control unit in accordance with the fifth embodiment.
Figure 16:
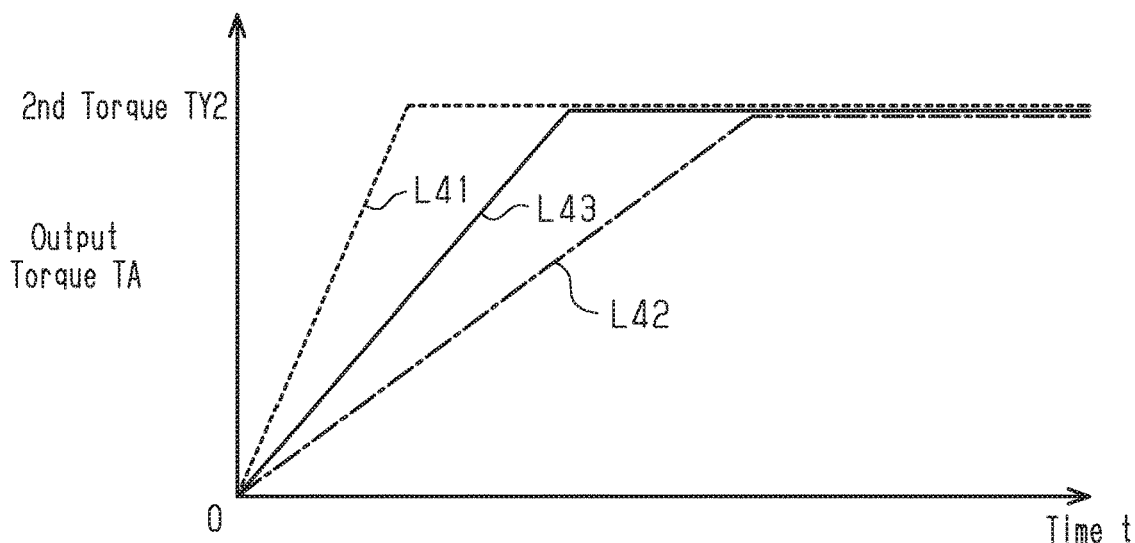
FIG. 16 is a timing chart in accordance with one example of the motor control in accordance with the fifth embodiment.

With reference to FIGS. 14 to 16, the motor control in the walk mode will now be described. The motor control is repeated in predetermined cycles as long as the electronic control unit 32 is supplied with power.

In step S71, the electronic control unit 32 determines whether or not there is a start request for driving the motor 22 in the walk mode. More specifically, if the operation unit 14 is operated to drive the motor 22 in the walk mode and the manual driving force T is zero, then the electronic control unit 32 determines that there is a start request for driving the motor 22 in the walk mode. If the electronic control unit 32 determines that there is no start request for driving the motor 22 in the walk mode, then the electronic control unit 32 ends the processing.

If the electronic control unit 32 determines that there is a start request for driving the motor 22 in the walk mode, then the electronic control unit 32 proceeds to step S72. In step S72, the electronic control unit 32 determines whether or not the pitch angle DA is greater than the first predetermined angle DX1. If the electronic control unit 32 determines that the pitch angle DA is greater than the first predetermined angle DX1, then the electronic control unit 32 proceeds to step S73. In step S73, the electronic control unit 32 sets the increase rate of the output torque TA to the first increase rate and then proceeds to step S77.

If the electronic control unit 32 determines in step S72 that the pitch angle DA is less than or equal to the first predetermined angle DX1, then the electronic control unit 32 proceeds to step S74. In step S74, then the electronic control unit 32 determines whether or not the pitch angle DA is less than the second predetermined angle D2. If the electronic control unit 32 determines that the pitch angle DA is less than the second predetermined angle D2, then the electronic control unit 32 proceeds to step S75. In step S75, the electronic control unit 32 sets the increase rate of the output torque TA to the second increase rate and then proceeds to step S77.

If the electronic control unit 32 determines in step S74 that the pitch angle DA is greater than or equal to the second predetermined angle D2, then the electronic control unit 32 proceeds to step S76. In step S76, the electronic control unit 32 sets the increase rate of the output torque TA to a third increase rate and then proceeds to step S77. In FIG. 16, the broken line L41 shows the output torque TA in a case in which the first increase rate is set. The single-dashed line L42 shows the output torque TA in a case in which the second increase rate is set. The solid line L43 shows the output torque TA in a case in which the third increase rate is set. The first increase rate is higher than the third increase rate. The second increase rate is lower than the third increase rate.

In step S77, the electronic control unit 32 starts driving the motor 22 at the increase rate set in step S73, S75, or S76 and then proceeds to step S78. In step S78, the electronic control unit 32 determines whether or not the output torque TA is greater than or equal to the second torque TY2. The electronic control unit 32 repeats the determination of step S78 until the output torque TA reaches the second torque TY2. The process of step S78 increases the output torque TA to the second torque TY2 as shown in FIG. 16 by the broken line L41, the single-dashed line L42, or the solid line 43.

If the electronic control unit 32 determines that the output torque TA is greater than or equal to the second torque TY2, then the electronic control unit 32 proceeds to step S79. In step S79, the electronic control unit 32 starts controlling the motor 22 in accordance with the vehicle speed V and then proceeds to step S80. In step S80, the electronic control unit 32 determines whether or not there is a drive termination request for the motor 22 in the walk mode. The electronic control unit 32 determines that there is a drive termination request for the motor 22 in the walk mode in any of the cases in which the operation unit 14 is no longer operated to drive the motor 22 in the walk mode, the operation unit 14 is operated to switch to the riding mode, and the manual driving force T becomes greater than zero. The electronic control unit 32 repeats the processes of steps S79 and S80 until determining that there is a drive termination request for the motor 22 in the walk mode. If the electronic control unit 32 determines that there is a drive termination request for the motor 22 in the walk mode, then the electronic control unit 32 in step S81 stops driving the motor 22 in the walk mode and ends the processing.

Sixth Embodiment

Figure 17:
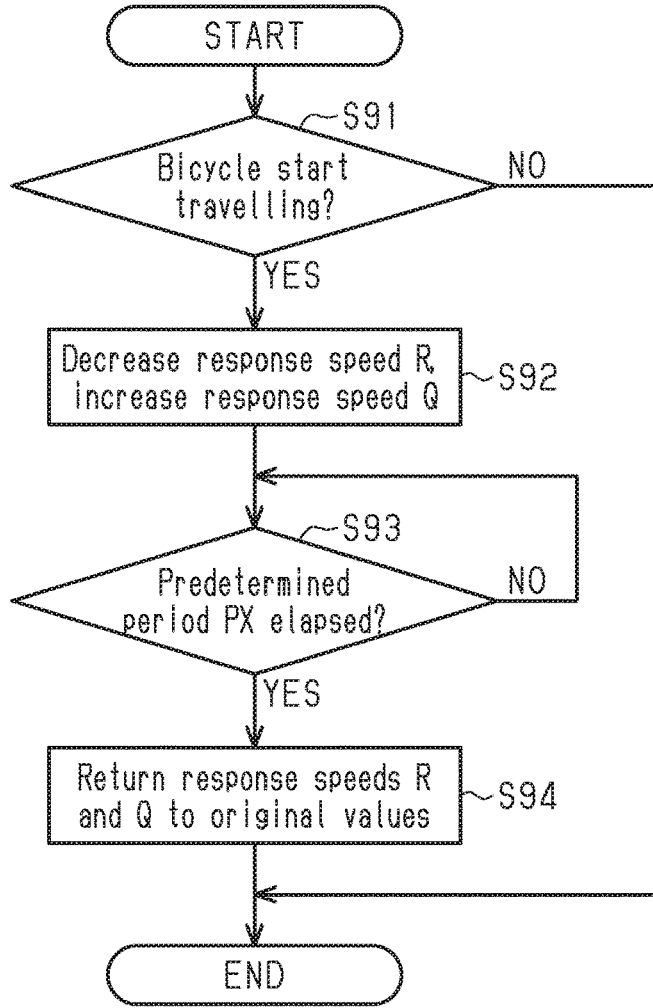
FIG. 17 is a flowchart of a motor control executed by the electronic control unit in accordance with a sixth embodiment.

Referring to FIG. 17, a sixth embodiment of the bicycle controller 30 will now be described. The sixth embodiment of the bicycle controller 30 is similar to the first embodiment of the bicycle controller 30 except in that a control is executed to change the response speeds R and Q as the bicycle starts to travel. Same reference numerals are given to those components that are the same as the corresponding components of the first embodiment. Such components will not be described in detail.

In the present embodiment, the electronic control unit 32 sets the response speeds R and Q so that the response speeds R and Q for a case during a predetermined period PX from the time at which the bicycle 10 starts to travel differs from the response speeds for a case in which the predetermined period PX has elapsed. In one example, the predetermined period PX is set to three seconds. The electronic control unit 32 sets the response speed Q for a case during the predetermined period PX from the time at which the bicycle 10 starts to travel to be higher than the response speed Q for a case in which the predetermined period PX has elapsed.

With reference to FIG. 17, motor control for changing the response speeds R and Q when the bicycle starts to travel will now be described. The motor control is repeated in predetermined cycles as long as the electronic control unit 32 is supplied with power.

In step S91, the electronic control unit 32 determines whether or not the bicycle 10 has started to travel. If the electronic control unit 32 determines that the bicycle 10 has not started to travel, then the electronic control unit 32 ends the processing. For example, the electronic control unit 32 determines that the bicycle 10 has started to travel if the vehicle speed V of the bicycle 10 changes from zero to greater than zero. Otherwise, the electronic control unit 32 determines that the bicycle 10 has not started to travel. If the electronic control unit 32 determines that the bicycle 10 has started to travel, then the electronic control unit 32 proceeds to step S92. In step S92, the electronic control unit 32 decreases the response speed R and increases the response speed Q. Then, the electronic control unit 32 proceeds to step S93. More specifically, the electronic control unit 32 decreases the response speed R to a value lower than the initial value RX of the response speed R that is stored beforehand in the memory 34 and increases the response speed Q to a value higher than the initial value QX of the response speed Q that is stored beforehand in the memory 34.

In step S93, the electronic control unit 32 determines whether or not the predetermined period PX has elapsed. For example, if the period from the time at which the electronic control unit 32 determined in step S91 that the bicycle 10 has started to travel is greater than or equal to the predetermined period PX, then the electronic control unit 32 determines that the predetermined period PX has elapsed. The electronic control unit 32 repeats the determination of step S93 until the predetermined period PX elapses. If the electronic control unit 32 determines that the predetermined period PX has elapsed, then the electronic control unit 32 proceeds to step S94. In step S94, the electronic control unit 32 returns the response speed R and the response speed Q to their original values and then ends the processing. More specifically, the electronic control unit 32 returns the response speed R and the response speed Q to the initial values RX and QX stored beforehand in the memory 34.

Seventh Embodiment

Figure 18:
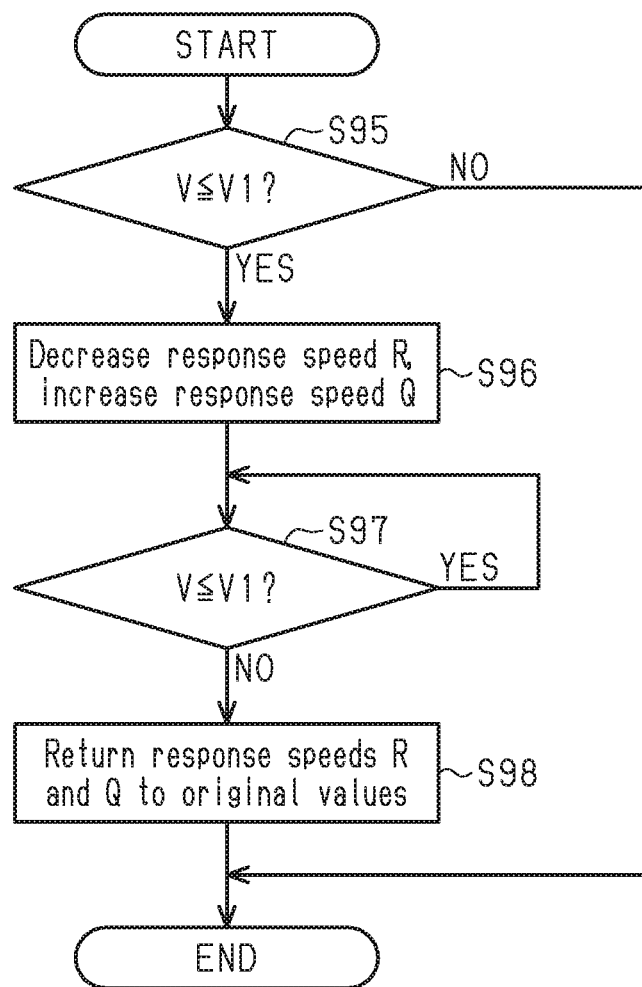
FIG. 18 is a flowchart of a motor control executed by the electronic control unit in accordance with a seventh embodiment.

Referring to FIGS. 1 and 18, a seventh embodiment of the bicycle controller 30 will now be described. The seventh embodiment of the bicycle controller 30 is similar to the first embodiment of the bicycle controller 30 except in that a control is executed to change the response speeds R and Q in accordance with the vehicle speed V. Same reference numerals are given to those components that are the same as the corresponding components of the first embodiment. Such components will not be described in detail.

In the present embodiment, the electronic control unit 32 sets the response speeds R and Q so that the response speeds R and Q for a case in which the vehicle speed V of the bicycle 10 is less than or equal to the first speed V1 differs from the response speeds R and Q for a case in which the vehicle speed V of the bicycle 10 exceeds the first speed V1. Preferably, the first speed V1 is set to the vehicle speed V that allows for determination that the bicycle 10 has started to travel. In one example, the first speed V1 is preferably set in the range from 1 to 10 km/h. In one example, the first speed V1 is set to 3 km/h. The electronic control unit 32 sets the response speed Q for a case in which the vehicle speed V of the bicycle 10 is less than or equal to the first speed V1 to be higher than the response speed Q for a case in which the vehicle speed V of the bicycle 10 exceeds the first speed V1. Further, the electronic control unit 32 sets the response speed R for a case in which the vehicle speed V of the bicycle 10 is less than or equal to the first speed V1 to be lower than the response speed R for a case in which the vehicle speed V of the bicycle 10 exceeds the first speed V1.

Referring to FIG. 18, the motor control that changes the first torque TY1 in accordance with the inclination angle D will now be described. The motor control is repeated in predetermined cycles as long as the electronic control unit 32 is supplied with power.

In step S95, the electronic control unit 32 determines whether or not the vehicle speed V is less than or equal to the first speed V1. If the electronic control unit 32 determines that the vehicle speed V is greater than the first speed V1, then the electronic control unit 32 ends the processing. If the electronic control unit 32 determines that the vehicle speed V is less than or equal to the first speed V1, then the electronic control unit 32 proceeds to step S96. In step S96, the electronic control unit 32 decreases the response speed R and increases the response speed Q. Then, the electronic control unit 32 proceeds to step S97. More specifically, the electronic control unit 32 decreases the response speed R to a value lower than the initial value RX of the response speed R that is stored beforehand in the memory 34 and increases the response speed Q to a value higher than the initial value QX of the response speed Q that is stored beforehand in the memory 34.

In step S97, the electronic control unit 32 determines whether or not the vehicle speed V is less than or equal to the first speed V1. The electronic control unit 32 repeats the determination of step S97 until the vehicle speed V becomes greater than the first speed V1. If the electronic control unit 32 determines that the vehicle speed V is greater than the first speed V1, then the electronic control unit 32 proceeds to step S98 and returns the response speed R and the response speed Q to their original values. The electronic control unit 32 then ends the processing. More specifically, the electronic control unit 32 returns the response speed R and the response speed Q to the initial values RX and QX stored beforehand in the memory 34.

Modified Examples

The present invention is not limited to the foregoing embodiment and various changes and modifications of its components can be made without departing from the scope of the present invention. Also, the components disclosed in the embodiment can be assembled in any combination for embodying the present invention. For example, some of the components can be omitted from all components disclosed in the embodiment. Further, several of the modified examples described below can be combined.

Figure 19:
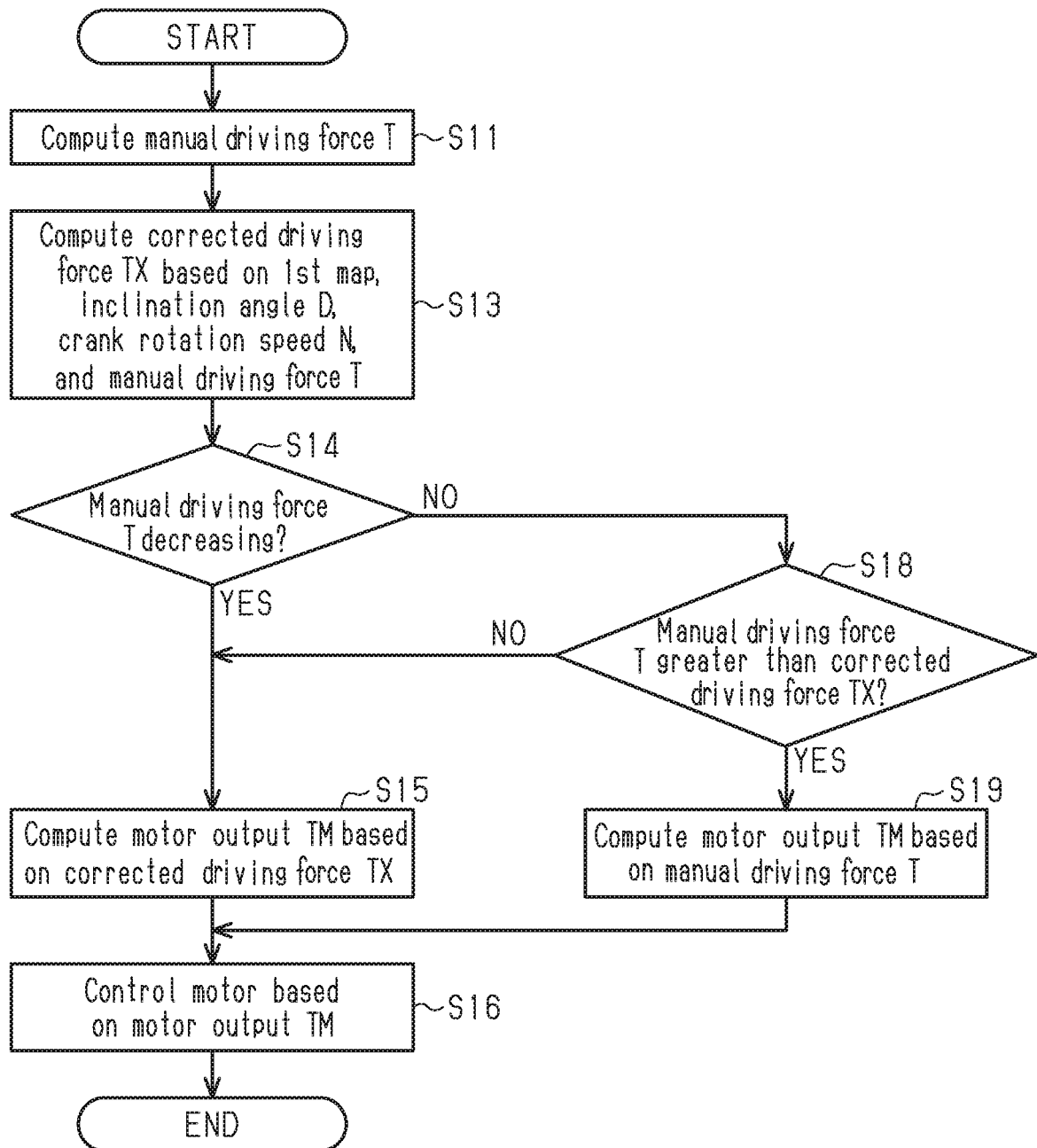
FIG. 19 is a flowchart in accordance with a first modified example of the motor control.

The motor control of FIG. 2 can be modified to the motor control shown in FIG. 19. In the motor control of FIG. 19, in step S11, the electronic control unit 32 computes the manual driving force T and then proceeds to step S13 without determining the riding mode. In step S13, the electronic control unit 32 computes the corrected driving force TX based on the first map, the inclination angle D, the crank rotation speed N, and the manual driving force T. Then, the electronic control unit 32 proceeds to step S14. In this modified example, the bicycle controller 30 functions in only one riding mode and stores only the first map. The bicycle controller 30 does not store the second map.

Figure 20:
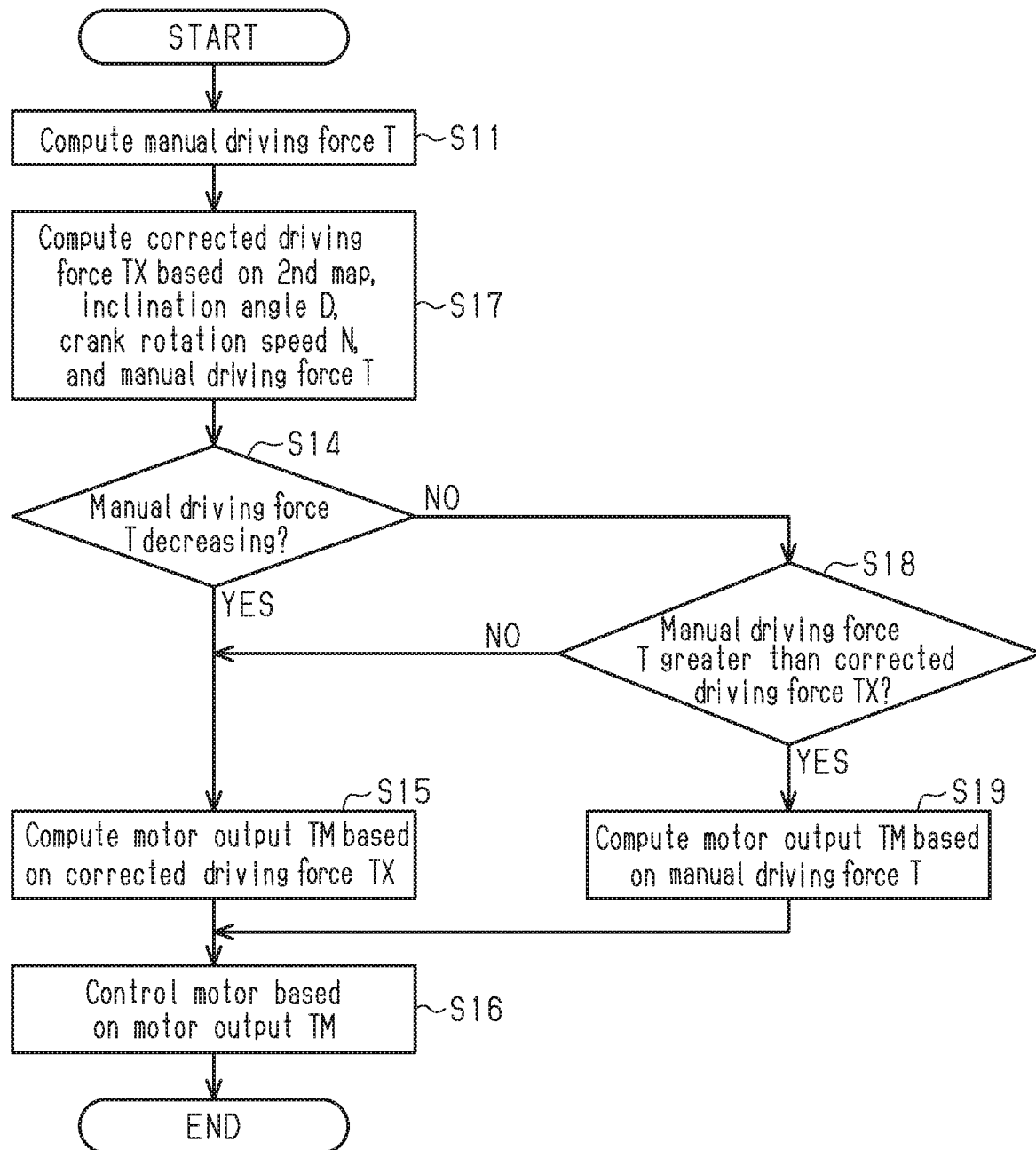
FIG. 20 is a flowchart in accordance with a second modified example of the motor control.

The motor control of FIG. 2 can be modified to the motor control shown in FIG. 20. In the motor control of FIG. 20, in step S11, the electronic control unit 32 computes the manual driving force T and then proceeds to step S17 without determining the riding mode. In step S17, the electronic control unit 32 computes the corrected driving force TX based on the second map, the inclination angle D, the crank rotation speed N, and the manual driving force T. Then, the electronic control unit 32 proceeds to step S14. In this modified example, the bicycle controller 30 functions in only one riding mode and stores only the second map. The bicycle controller 30 does not store the second map.

Figure 21:
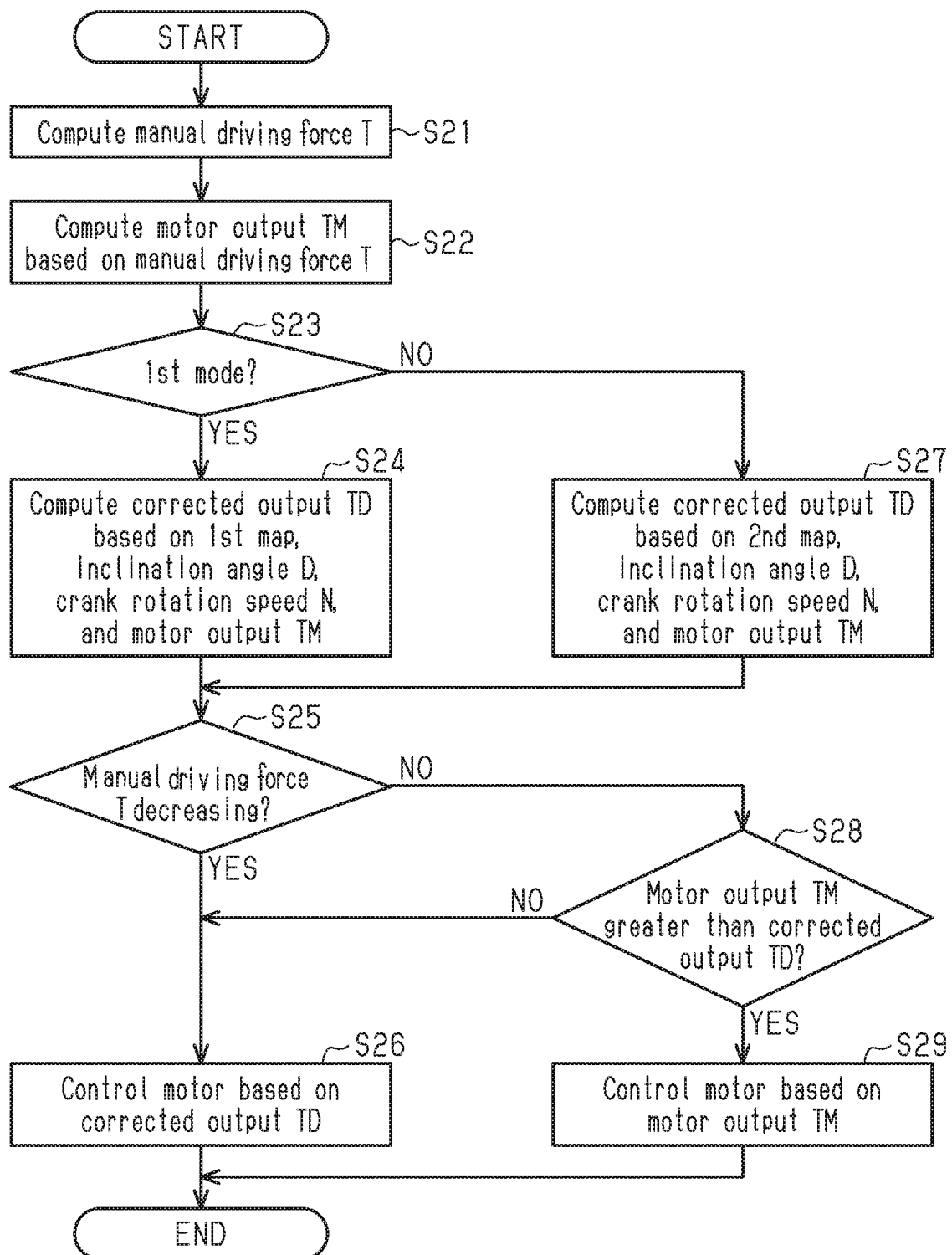
FIG. 21 is a flowchart in accordance with a third modified example of the motor control.

The motor control of FIG. 2 can be modified to the motor control shown in FIG. 21. Instead of correcting the manual driving force T, the correction unit 48 is configured to correct the motor output TM, which is computed based on the manual driving force T by the output computation unit 50. In the motor control of FIG. 21, in step S21, the electronic control unit 32 computes the manual driving force T. In step S22, the electronic control unit 32 multiplies the manual driving force T by a predetermined value to compute the motor output TM. In step S23, the electronic control unit 32 determines whether or not the present riding mode is the first mode. If the electronic control unit 32 determines that the riding mode is the first mode, then the electronic control unit 32 proceeds to step S24. In step S24, the electronic control unit 32 computes a corrected output TD based on the first map, the inclination angle D, the crank rotation speed N, and the motor output TM. Then, the electronic control unit 32 proceeds to step S25. If the electronic control unit 32 determines in step S23 that the present riding mode is not the first mode, that is, the present mode is the second mode, then the electronic control unit 32 proceeds to step S27. In step S27, the electronic control unit 32 computes the corrected output TD based on the second map, the inclination angle D, the crank rotation speed N, and the motor output TM.

In step S25, the electronic control unit 32 determines whether or not the manual driving force T is decreasing. If the electronic control unit 32 determines in step S25 that the manual driving force T is decreasing, then the electronic control unit 32 proceeds to step S26 and controls the motor 22 based on the corrected output TD. Then, after a predetermined cycle, the electronic control unit 32 starts the process again from step S21.

If the electronic control unit 32 determines in step S25 that the manual driving force T is not decreasing, then the electronic control unit 32 proceeds to step S28 and determines whether or not the motor output TM is greater than the corrected output TD. If the electronic control unit 32 determines in step S28 that the motor output TM is greater than the corrected output TD, then the electronic control unit 32 proceeds to step S29 and controls the motor 22 based on the motor output TM. Then, after a predetermined cycle, the electronic control unit 32 starts the process again from step S21.

If the electronic control unit 32 determines in step S28 that the motor output TM is less than or equal to the corrected output TD, then the electronic control unit 32 proceeds to step S26 and controls the motor 22 based on the corrected output TD. Then, after a predetermined cycle, the electronic control unit 32 starts the process again from step S21.

In the first and second embodiments, the electronic control unit 32 can be configured to change the response speed R in accordance with the inclination angle D regardless of the crank rotation speed N. More specifically, the electronic control unit 32 can set the time constant K using the first map and the second map that include only the relationship of the inclination angle D and the time constant K. That is, the electronic control unit 32 sets the time constant K in accordance with the inclination angle D regardless of the crank rotation speed N.

In the first and second embodiments, the electronic control unit 32 sets the time constant K using the first map or the second map. Instead of using a map, the electronic control unit 32 can use a computation equation to set the time constant K. In this case, the memory 34 stores computation equations corresponding to riding modes such as equations (1) and (2), which are described above.

In the first and second embodiments, in the first mode and the second mode, the electronic control unit 32 changes the response speed R in a stepped manner in accordance with the inclination angle D. However, the response speed R can be changed in a continuous manner in accordance with the inclination angle D. In this case, for example, coefficients A1, A2, and B, which are used in equations (1) and (2), are calculated from functions that change in accordance with the inclination angle D.

In the first embodiment, if the manual driving force T increases on a downhill, then the electronic control unit 32 can decrease the response speed R as the inclination angle D of the downhill increases.

In the second embodiment, the increase rate of the manual driving force T can be set to be lower than the increase rate of the manual driving force T in a case in which the response speed Q is set to the initial value QX. In this case, as the response speed Q increases from the initial value QX, the increase rate of the manual driving force T approaches the increase rate of the corrected driving force TX. As the response speed Q decreases from the initial value QX, the increase rate of the corrected driving force TX is retarded from the increase rate of the manual driving force T. In this modified example, in a case in which the electronic control unit 32 increases the manual driving force T, the electronic control unit 32 can change the response speed Q by changing the time constant K instead of changing the response speed Q by adding the corrected value CX to the manual driving force T or multiplying the manual driving force T by the corrected value CX. More specifically, the time constant K corresponding to the initial value QX is set to a value that is greater than zero. In this case, for example, the increase rate of the motor output TM during period X2 from time t30 to time t31 in the timing chart C of FIG. 8 becomes closer to the increase rate of the manual driving force T than the increase rate of the motor output TM during period X2 from time t31 to time t32. Further, the increase rate of the motor output TM during period X2 from time t41 to time t42 in the timing chart C of FIG. 9 becomes closer to the increase rate of the manual driving force T than the increase rate of the motor output TM during period X2 from time t41 to time t42.

In the second embodiment, one of the first mode and the second mode can be omitted. For example, in a case in which the second mode is omitted, in the motor control of FIG. 7, the electronic control unit 32 can omit steps S32, S38, S39 and S40. In this case, after performing the process of step S31, the electronic control unit 32 proceeds to step S33. In a case in which the first mode is omitted, in the motor control of FIG. 7, the electronic control unit 32 can omit steps S32, S33, S34 and S37. In this case, after performing the process of step S31, the electronic control unit 32 proceeds to step S38.

In the third embodiment, instead of performing the determination of step S44, the electronic control unit 32 can determine whether or not the vehicle speed V is greater than or equal to a second speed V2. In one example, the second speed V2 is set to 15 km/h. The electronic control unit 32 repeats the determination of step S44 until the vehicle speed V becomes greater than or equal to the second speed V2. If the vehicle speed V becomes greater than or equal to the second speed V2, then the electronic control unit 32 proceeds to step S45.

In the third embodiment, instead of the determination of step S50, the electronic control unit 32 can determine whether or not the vehicle speed V is greater than or equal to the second speed V2. If the vehicle speed V becomes greater than or equal to the second speed V2, then the electronic control unit 32 proceeds to step S51.

In the third embodiment, one of the response speed R and the response speed Q for a case during the predetermined period PX1 from the time at which the bicycle 10 starts to travel can be different from that for a case in which the predetermined period PX1 has elapsed. More specifically, in at least one of step S43 and step S47 in FIG. 10, the electronic control unit 32 can change just one of the response speed R and the response speed Q.

In the third embodiment, at least one of step S44 and step S50 can be omitted from the flowchart of FIGS. 10 and 11. In a case in which step S44 is omitted, if the electronic control unit 32 performs step S43 or step S47, then the electronic control unit 32 ends the processing. In this case, if the electronic control unit 32 determines in step S46 that the pitch angle DA is greater than or equal to the second predetermined angle D2, then the electronic control unit 32 can proceed to step S45. In a case in which step S50 is omitted, if the electronic control unit 32 performs step S49 or step S53, then the electronic control unit 32 ends the processing. In this case, if the electronic control unit 32 determines in step S52 that the pitch angle DA is greater than or equal to the second predetermined angle D2, then the electronic control unit 32 can proceed to step S51.

In the third embodiment, the electronic control unit 32 can set the response speeds R and Q for a case in which the vehicle speed V of the bicycle 10 is less than or equal to the first speed V1 to be different from the response speeds R and Q for a case in which the vehicle speed V of the bicycle 10 exceeds the first speed V1.

In the third embodiment and its modified examples, steps S41 and S48 to S53 can be omitted from the flowchart of FIGS. 10 and 11.

In the third embodiment, if the electronic control unit 32 sets the response speeds R and Q for a case in which the vehicle speed V of the bicycle 10 is less than or equal to the first speed V1 to be different from the response speeds R and Q for a case in which the vehicle speed V of the bicycle 10 exceeds the first speed V1, then the electronic control unit 32 can change and differ just one of the response speed R and the response speed Q. For example, in steps S43 and S47 of FIG. 10, the electronic control unit 32 changes only one of the response speed R and the response speed Q. In steps S49 and S53 of FIG. 11, the electronic control unit 32 changes only one of the response speed R and the response speed Q.

In the third embodiment and its modified examples, in a case in which the electronic control unit 32 changes the response speeds R and Q in accordance with the pitch angle DA of the bicycle 10, the electronic control unit 32 can change just one of the response speed R and the response speed Q. For example, in at least one of steps S43, S47, S49 and S53 of FIGS. 10 and 11, only one of the response speed R and the response speed Q is changed.

In the third embodiment and its modified examples, step S46 and S47 can be omitted from the flowchart of FIG. 10. In this case, if the electronic control unit 32 determines in step S42 that the pitch angle DA is less than or equal to the first predetermined angle DX1, then the electronic control unit 32 proceeds to step S44.

In the third embodiment and its modified examples, steps S42 and S43 can be omitted from the flowchart of FIG. 10. In this case, if the electronic control unit 32 determines in step S41 that the vehicle speed V is less than or equal to the first speed V1, then the electronic control unit 32 proceeds to step S46.

In the third embodiment and its modified examples, steps S52 and S53 can be omitted from the flowchart of FIG. 11. In this case, if the electronic control unit 32 determines in step S48 that the pitch angle DA is less than or equal to the first predetermined angle DX1, then the electronic control unit 32 proceeds to step S50.

In the third embodiment and its modified examples, steps S48 and S49 can be omitted from the flowchart of FIG. 11. In this case, if the electronic control unit 32 determines in step S41 that the vehicle speed V is greater than the first speed V1, then the electronic control unit 32 proceeds to step S52.

In the third embodiment and its modified examples, the flowchart of FIG. 10 can be ended in a case in which the process of step S47 ends. Further, the flowchart of FIGS. 10 and 11 can be ended in a case in which the process of step S53 ends.

In the fourth embodiment, steps S65, S66 and S67 can be omitted from the flowchart of FIG. 13. In this case, if the electronic control unit 32 determines in step S61 that the pitch angle DA is less than or equal to the first predetermined angle DX1, then the electronic control unit 32 ends the processing.

In the fourth embodiment, steps S61, S62 and S63 can be omitted from the flowchart of FIG. 13. In this case, if the electronic control unit 32 is supplied with power, then the electronic control unit 32 performs the process of step S65.

In the fifth embodiment, steps S74 and S75 can be omitted from the flowchart of FIG. 14. In this case, if the electronic control unit 32 determines in step S72 that the pitch angle DA is less than or equal to the first predetermined angle DX1, then the electronic control unit 32 proceeds to step S76.

In the fifth embodiment, step S72 and step S73 can be omitted from the flowchart of FIG. 14. In this case, if the electronic control unit 32 determines in step S71 that there is a start request for driving the motor 22 in the walk mode, the electronic control unit 32 proceeds to step S74.

Figure 22:
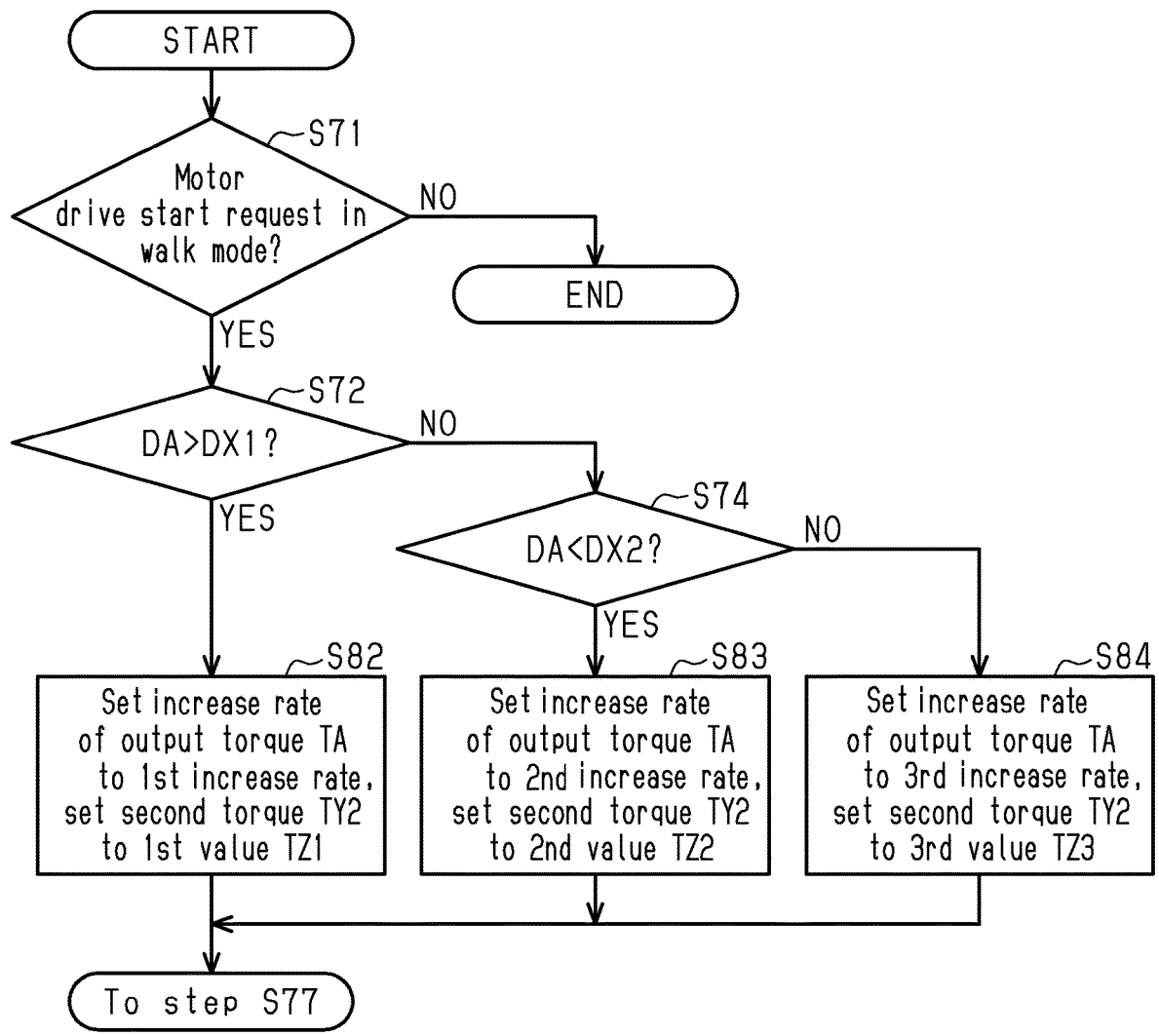
FIG. 22 is a flowchart in accordance with a fourth modified example of the motor control.

In the fifth embodiment and its modified examples, the second torque TY2 can be changed in accordance with the inclination angle D of the bicycle 10. In one example, the electronic control unit 32 increases the second torque TY2 if the inclination angle of the bicycle 10 increases on an uphill. If the inclination angle D of the bicycle 10 increases on a downhill, then the electronic control unit 32 decreases the second torque TY2. For example, as shown in FIG. 22, the electronic control unit 32 performs step S82 instead of step S73 of FIG. 14, step S83 instead of step S75 of FIG. 14, and step S84 instead of step S76 of FIG. 14. In step S82, the electronic control unit 32 sets the increase rate of the output torque TA to the first increase rate and sets the second torque TY2 to a first value TZ1. In step S83, the electronic control unit 32 sets the increase rate of the output torque TA to the second increase rate and sets the second torque TY2 to a second value TZ2. In step S84, the electronic control unit 32 sets the increase rate of the output torque TA to the third increase rate and sets the second torque TY2 to a third value TZ3. The first value TZ1 is greater than the third value TZ3. The second value TZ2 is less than the third value TZ3. Thus, if the pitch angle DA is greater than the first predetermined angle DX1, then the electronic control unit 32 controls the motor 22 to become less than or equal to the second torque TY2, which is greater than for a case in which the pitch angle DA is greater than or equal to the second predetermined angle D2 and less than or equal to the first predetermined angle DX1. If the pitch angle DA is less than the second predetermined angle D2, then the electronic control unit 32 controls the motor 22 to become less than or equal to the second torque TY2, which is less than for a case in which the pitch angle DA is greater than or equal to the second predetermined angle D2 and less than or equal to the first predetermined angle DX1.

In the modified example shown in FIG. 22, the process for changing the output torque TA can be omitted in at least one of steps S82, S83, and S84. In this case, the increase rate of the output torque TA is constant regardless of the inclination angle D of the bicycle 10.

In the modified example shown in FIG. 22, steps S74 to S83 can be omitted from the flowchart. In this case, if the electronic control unit 32 determines in step S72 that the pitch angle DA is less than or equal to the first predetermined angle DX1, then the electronic control unit 32 proceeds to step S84.

In the modified example shown in FIG. 22, steps S72 and S82 can be omitted from the flowchart. In this case, if the electronic control unit 32 determines that there is a start request for driving the motor 22 in the walk mode, then the electronic control unit 32 proceeds to step S74.

Figure 23:
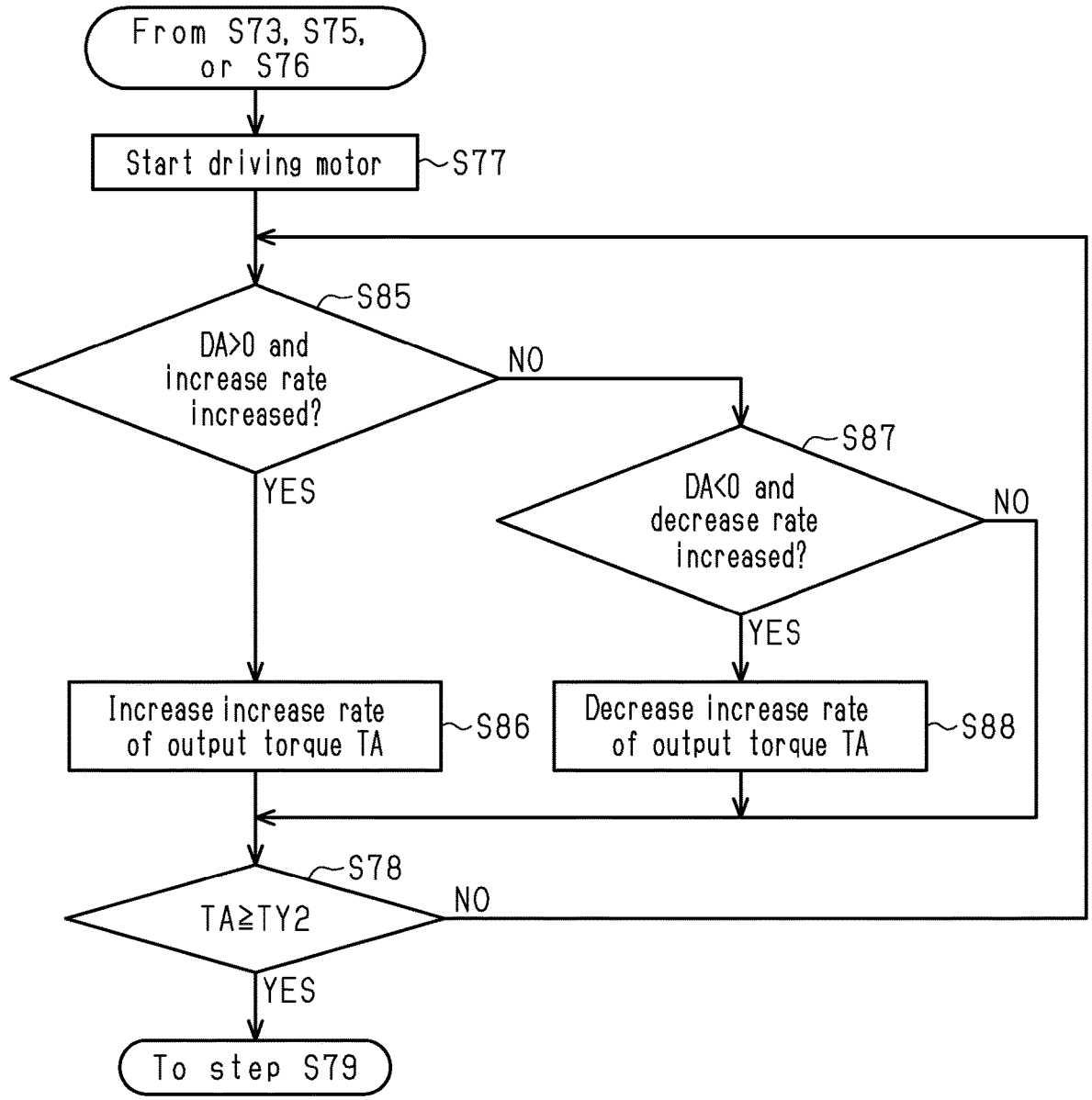
FIG. 23 is a flowchart in accordance with a fifth modified example of the motor control.

In the fifth embodiment, the electronic control unit 32 can change the increase rate of the output torque TA of the motor 22 in accordance with the change amount of the inclination angle D of the bicycle 10. In one example, if the increase rate of the inclination angle D of the bicycle 10 on an uphill increases, then the electronic control unit 32 increases the increase rate of the output torque TA of the motor 22. If the increase rate of the inclination angle D of the bicycle 10 on a downhill increases, then the electronic control unit 32 decreases the increase rate of the output torque TA of the motor 22. For example, after the electronic control unit 32 sets the increase rate of the output torque TA in step S73, S75 or step S76 of FIG. 14, the electronic control unit 32 proceeds to step S85, which is shown in FIG. 23. In step S85, the electronic control unit 32 determines whether or not the pitch angle DA has become greater than zero and whether or not the increase rate of the pitch angle DA has increased. If the electronic control unit 32 determines that the pitch angle DA is greater than zero and that the increase rate of the pitch angle DA has increased, then the electronic control unit 32 proceeds to step S86. In step S86, the electronic control unit 32 increases the increase rate of the output torque TA and then proceeds to step S78. In a case in which the electronic control unit 32 in step S85 gives at least one of a determination that the pitch angle DA is less than or equal to zero and a determination that the increase rate of the pitch angle DA has not increased, the electronic control unit 32 proceeds to step S87. In step S87, the electronic control unit 32 determines whether or not the pitch angle DA is less than zero and whether or not the decrease rate of the pitch angle DA has increased. If the electronic control unit 32 determines that the pitch angle DA is less than zero and that the decrease rate of the pitch angle DA has increased, then the electronic control unit 32 proceeds to step S88. In step S88, the electronic control unit 32 decreases the increase rate of the output torque TA and proceeds to step S78. In step S78, the electronic control unit 32 repeats the processes from step S85 until the output torque TA becomes greater than or equal to the second torque TY2. If the electronic control unit 32 determines in step S78 that the output torque TA has become greater than or equal to the second torque TY2, then the electronic control unit 32 proceeds to step S79. If the electronic control unit 32 in step S87 gives at least one of a determination that the pitch angle DA is zero or greater and a determination that the decrease rate of the pitch angle DA has not increased, then the electronic control unit 32 proceeds to step S78.

In the modified example shown in FIG. 23, steps S87 and S88 can be omitted from the flowchart. In this case, if the electronic control unit 32 in step S85 gives at least one of a determination that the pitch angle DA is zero or less and a determination that the increase rate of the pitch angle DA has not increased, then the electronic control unit 32 proceeds to step S78.

In the modified example shown in FIG. 23, steps S85 and S86 can be omitted from the flowchart. In this case, the electronic control unit 32 performs the process of step S77 and then proceeds to step S87.

In the sixth embodiment, the electronic control unit 32 does not have to change the response speed R. More specifically, in step S92 of FIG. 17, the electronic control unit 32 changes the response speed Q but does not change the response speed R.

In the sixth embodiment, the electronic control unit 32 can change the response speeds R and Q after the electronic control unit 32 is supplied with power and before the bicycle 10 starts to travel. For example, in the flowchart of FIG. 17, step S91 and step S92 are reversed. In this case, if the bicycle 10 stops, then the electronic control unit 32 can perform the process of step S92. The electronic control unit 32 proceeds to step S91 as the bicycle 10 starts to travel. If the electronic control unit 32 determines in step S91 that the bicycle 10 has started to travel, then the electronic control unit 32 proceeds to step S93.

In the seventh embodiment, the electronic control unit 32 does not have to change the response speed R. More specifically, in step S96 of FIG. 18, the electronic control unit 32 changes the response speed Q but does not change the response speed R.

In the seventh embodiment, the electronic control unit 32 can change the response speeds R and Q after the electronic control unit 32 is supplied with power and before the vehicle speed V becomes greater than zero and less than or equal to the first speed V1. For example, in the flowchart of FIG. 18, step S95 and step S96 can be reversed. In this case, if the bicycle 10 stops, then the electronic control unit 32 can perform the process of step S96. If the electronic control unit 32 determines in step S95 that the vehicle speed V is less than or equal to the first speed V1, then the electronic control unit 32 proceeds to step S97.

The electronic control unit 32 can change the response speeds R and Q in accordance with changes in the inclination angle D of the bicycle 10. In a case in which the increase rate of the inclination angle D of the bicycle 10 increases on an uphill, the electronic control unit 32 increases the response speed Q if the manual driving force T increases on an uphill. In a case in which the increase rate of the inclination angle D of the bicycle 10 increases on an uphill, the electronic control unit 32 decreases the response speed R. For example, the electronic control unit 32 executes the control shown in FIG. 24. In step S101, the electronic control unit 32 determines whether or not the pitch angle DA is greater than zero and the increase rate of the pitch angle DA has increased. If the electronic control unit 32 determines that the pitch angle DA is greater than zero and that the increase rate of the pitch angle DA has increased, then the electronic control unit 32 proceeds to step S102. In step S102, the electronic control unit 32 decreases the response speed R and increases the response speed Q. Then, the electronic control unit 32 ends the processing. If the electronic control unit 32 in step S101 gives at least one of a determination that the pitch angle DA is zero or less and a determination that the increase rate of the pitch angle DA has not increased, then the electronic control unit 32 proceeds to step S103. In step S103, the electronic control unit 32 determines whether or not the pitch angle DA is less than zero and whether or not the decrease rate of the pitch angle DA has increased. If the electronic control unit 32 determines that the pitch angle DA is less than zero and that the decrease rate of the pitch angle DA has increased, then the electronic control unit 32 proceeds to step S104. In step S104, the electronic control unit 32 increases the response speed R and decreases the response speed Q. If the electronic control unit 32 in step S103 gives at least one of a determination that the pitch angle DA is zero or greater and a determination that the decrease rate of the pitch angle DA is not increasing, then the electronic control unit 32 ends the processing without changing the response speeds R and Q. In this modified example, after changing the response speeds R and Q in step S102 and step S104, the electronic control unit 32 can return the response speeds R and Q to their original values after a predetermined period.

Figure 24:
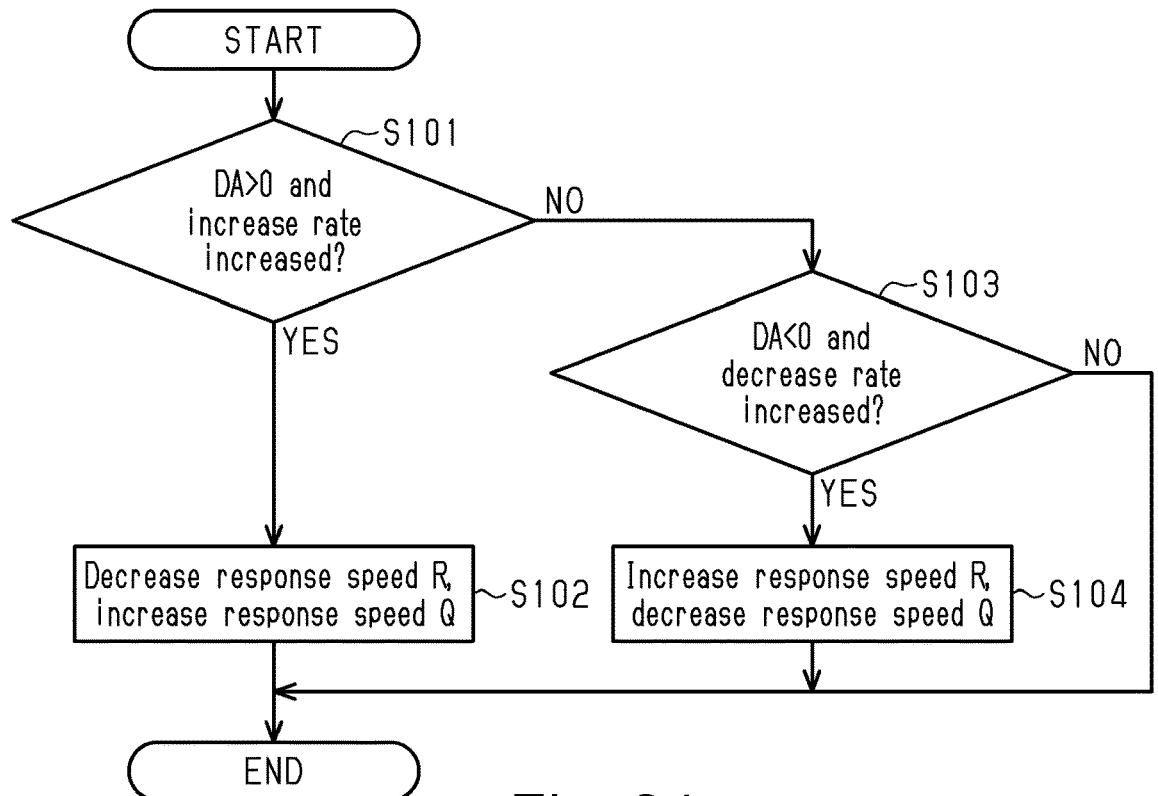
FIG. 24 is a flowchart in accordance with a sixth modified example of the motor control.

In the modified example shown in FIG. 24, step S103 and step S104 can be omitted from the flowchart. In this case, if the electronic control unit 32 in step S101 gives at least one of a determination that the pitch angle DA is zero or less and a determination that the increase rate of the pitch angle DA is not increasing, then the electronic control unit 32 ends the processing.

In the modified example shown in FIG. 24, steps S101 and S102 can be omitted from the flowchart. In this case, the electronic control unit 32 performs the process of step S103 if the electronic control unit 32 is supplied with power.

Figure 25:
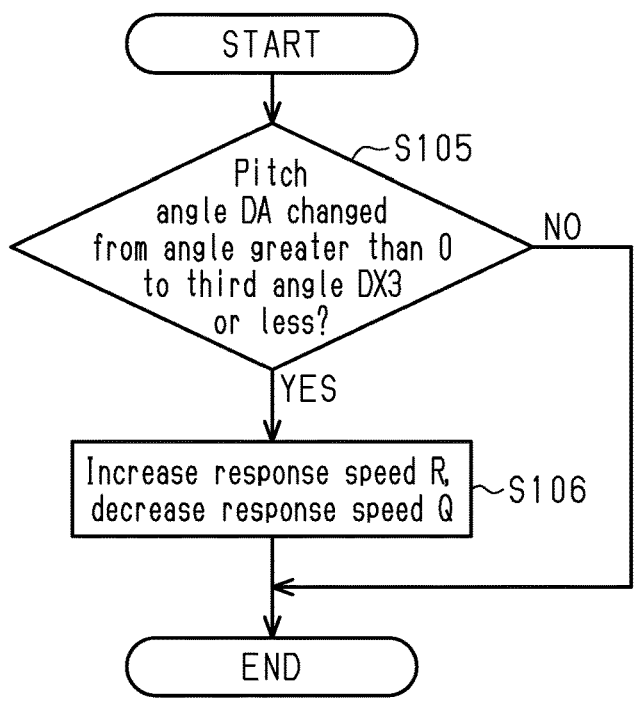
FIG. 25 is a flowchart in accordance with a seventh modified example of the motor control.

If the inclination angle D of the bicycle 10 changes from an angle corresponding to an uphill to a third angle DX3 or greater that corresponds to a downhill during a first period, then the electronic control unit 32 can decrease the response speed Q if the manual driving force T increases. If the inclination angle D of the bicycle 10 changes from an angle corresponding to an uphill to the third angle DX3 or greater that corresponds to a downhill during the first period, then the electronic control unit 32 can increase the response speed R. Preferably, the first period can be set to a range of one to ten seconds. In one example, the first period is set to three seconds. Preferably, the first period is stored beforehand in the memory 34. The memory 34 is configured to allow the first period to be changed. For example, the operation of the operation unit 14 or the use of an external device changes the first period stored in the memory 34. For example, the electronic control unit 32 executes the control shown in FIG. 25. In step S105, the electronic control unit 32 determines whether or not the pitch angle DA has changed from an angle greater than zero to the third angle DX3 or less that is less than zero. If the electronic control unit 32 determines that the pitch angle DA has changed from an angle greater than zero to the third angle DX3 or less that is less than zero, then the electronic control unit 32 proceeds to step S106. In step S106, the electronic control unit 32 increases the response speed R and decreases the response speed Q. Then, the electronic control unit 32 ends the processing. If the electronic control unit 32 determines in step S105 that the pitch angle DA has not changed from an angle greater than zero to the third angle DX3 or less that is less than zero, then the electronic control unit 32 ends the processing without changing the response speeds R and Q. In this modified example, after changing the response speeds R and Q in step S106, the electronic control unit 32 can return the response speeds R and Q to their original values after a predetermined period. In the flowchart of FIG. 25, the electronic control unit 32 does not have to change the response speed R.

The electronic control unit 32 can obtain the inclination angle D using the Global Positioning System (GPS) and map information including altitude information. Further, the electronic control unit 32 can include an altitude sensor that detects the atmospheric pressure. In this case, the electronic control unit 32 can accurately obtain the inclination angle D using the output of the altitude sensor in addition to the GPS information. An inclination detector can include a GPS receiver, a memory that stores map information, and an altitude sensor. Information of the inclination angle D obtained by the GPS can be input to the electronic control unit 32, for example, via a cycle computer, a smartphone, or the like. The rider can also input the inclination angle D to the electronic control unit 32.

The low-pass filter 52 can be replaced by a moving average filter. As long as the response speed R of the motor 22 with respect to a change in the manual driving force T can be changed, any structure can be employed.

The electronic control unit 32 can compute the inclination angle D based on the manual driving force T and the crank rotation speed N. In this case, for example, the electronic control unit 32 computes a large pitch angle DA if the manual driving force T is high and the crank rotation speed N is low. More specifically, the electronic control unit 32 determines that the inclination angle D on an uphill is large when the manual driving force T is high and the crank rotation speed N is low and determines that the inclination angle D on a downhill is large when the manual driving force T is low and the crank rotation speed N is high. Further, in this modified example, the inclination angle D can be computed using the speed of the bicycle 10 in addition to the manual driving force T and the crank rotation speed N.

The electronic control unit 32 can estimate the crank rotation speed N using the speed of the bicycle 10. For example, the electronic control unit 32 can estimate the crank rotation speed N using the tire diameter and the gear ratio of the bicycle 10.

What is claimed is:

1. A bicycle controller comprising:
an electronic control unit configured to control a motor that assists in propulsion of a bicycle in accordance with operation of an operation unit provided on the bicycle,
the electronic control unit being configured to change an output torque of the motor at an increase rate in accordance with at least one of an inclination angle of the bicycle and a change amount of the inclination angle of the bicycle.

2. The bicycle controller according to claim 1, wherein
the electronic control unit is further configured to increase the increase rate of the output torque of the motor in a case in which the inclination angle of the bicycle increases on an uphill.

3. The bicycle controller according to claim 1, wherein
the electronic control unit is further configured to decrease the increase rate of the output torque of the motor in a case in which the inclination angle of the bicycle increases on a downhill.

4. The bicycle controller according to claim 1, wherein
the electronic control unit is further configured to increase the increase rate of the output torque of the motor in a case in which an increase rate of the inclination angle of the bicycle increases on an uphill.

5. The bicycle controller according to claim 1, wherein
the electronic control unit is further configured to decrease the increase rate of the output torque of the motor in a case in which an increase rate of the inclination angle of the bicycle increases on a downhill.

6. The bicycle controller according to claim 1, further comprising
an inclination detector that detects the inclination angle of the bicycle.

7. The bicycle controller according to claim 1, wherein
the electronic control unit is further configured to compute the inclination angle based on the manual driving force and a rotation speed of a crank of the bicycle.

8. The bicycle controller according to claim 1, wherein
the electronic control unit is further configured to switch between a riding mode and a walk mode in accordance with operation of the operation unit, and
the electronic control unit is further drive the motor upon the walk mode being selected by the operation unit.

9. The bicycle controller according to claim 8, wherein
the electronic control unit is further configured to increase the increase rate of the output torque of the motor in a case in which the inclination angle of the bicycle increases on an uphill while the walk mode.

10. The bicycle controller according to claim 8, wherein
the electronic control unit is further configured to decrease the increase rate of the output torque of the motor in a case in which the inclination angle of the bicycle increases on a downhill while the walk mode.

11. The bicycle controller according to claim 8, wherein
the electronic control unit is further configured to increase the increase rate of the output torque of the motor in a case in which an increase rate of the inclination angle of the bicycle increases on an uphill while the walk mode.

12. The bicycle controller according to claim 8, wherein
the electronic control unit is further configured to decrease the increase rate of the output torque of the motor in a case in which an increase rate of the inclination angle of the bicycle increases on a downhill while the walk mode.

* * * * *